United States Patent
Agarwal et al.

(10) Patent No.: US 9,172,636 B2
(45) Date of Patent: Oct. 27, 2015

(54) EFFICIENT LINK REPAIR MECHANISM TRIGGERED BY DATA TRAFFIC

(75) Inventors: Navneet Agarwal, Bangalore (IN); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 746 days.

(21) Appl. No.: 13/406,771

(22) Filed: Feb. 28, 2012

(65) Prior Publication Data
US 2013/0227336 A1 Aug. 29, 2013

(51) Int. Cl.
| | |
|---|---|
| H04L 12/703 | (2013.01) |
| H04L 12/26 | (2006.01) |
| H04L 12/24 | (2006.01) |
| H04L 12/751 | (2013.01) |
| H04L 12/721 | (2013.01) |
| H04L 12/707 | (2013.01) |

(52) U.S. Cl.
CPC ............ *H04L 45/28* (2013.01); *H04L 41/0677* (2013.01); *H04L 43/0811* (2013.01); *H04L 45/02* (2013.01); *H04L 45/14* (2013.01); *H04L 45/22* (2013.01)

(58) Field of Classification Search
CPC ..... H04L 45/02; H04L 45/28; H04L 41/0677; H04L 40/26; H04W 84/18
See application file for complete search history.

(56) References Cited

U.S. PATENT DOCUMENTS

| | | | |
|---|---|---|---|
| 5,844,902 A  * | 12/1998 | Perlman ........................ | 370/401 |
| 6,304,556 B1 * | 10/2001 | Haas ............................. | 370/254 |
| 7,620,848 B1 | 11/2009 | Tanner | |
| 7,869,350 B1 | 1/2011 | Bryant et al. | |
| 8,493,841 B2 * | 7/2013 | Nozaki et al. ................ | 370/221 |
| 2004/0143842 A1* | 7/2004 | Joshi .............................. | 725/32 |
| 2008/0074997 A1 | 3/2008 | Bryant et al. | |
| 2008/0259923 A1 | 10/2008 | Bryant et al. | |
| 2009/0225652 A1 | 9/2009 | Vasseur et al. | |
| 2009/0228575 A1* | 9/2009 | Thubert et al. ............... | 709/220 |
| 2009/0323519 A1* | 12/2009 | Pun .............................. | 370/225 |
| 2011/0280123 A1 | 11/2011 | Wijnands et al. | |

FOREIGN PATENT DOCUMENTS

EP    0455442 A2    11/1991

OTHER PUBLICATIONS

Chakeres & Perkins "Dynamic MANET On-demand(DYMO) Routing", draft-ietf-manet-dymo-21, Jul. 26, 2010.*

(Continued)

*Primary Examiner* — Joseph Bednash
(74) *Attorney, Agent, or Firm* — Parker Ibrahim & Berg LLC; James M. Behmke; Stephen D. LeBarron

(57) ABSTRACT

In one embodiment, an intermediate device transmits a data message away from a root device toward a receiver device in a computer network, the data message transmitted by utilizing, in reverse, a link that had been previously selected by the receiver device toward the root device. In response to detecting that the data message did not reach the receiver device, a discovery message is may be sent to one or more neighbor devices, wherein the discovery message carries an identification (ID) of the receiver device and a discovery scope indicating how many hops the discovery message is allowed to traverse to reach the receiver device, and wherein the receiver device, upon receiving the discovery message, triggers a local link repair of the link from the receiver device toward the root device.

16 Claims, 23 Drawing Sheets

(56) References Cited

OTHER PUBLICATIONS

Perkins et al. "Ad hoc On-Demand Distance Vector (AODV) Routing", Network Working Group, RFC 3561 Jul. 2003.*
Gnawali, et al., "The Minimum Rank Objective Function with Hysteresis", draft-ieft-roll-minrank-hysteresis-of-04, IETF Internet-Draft, May 2011, 11 pages.
Thubert, et al., "RPL Objective Function Zero", draft-ietf-roll-of0-15, IETF Internet-Draft, Jul. 2011, 14 pages.
Vasseur, et al., "Routing Metrics Used for Path Calculation in Low Power and Lossy Networks", draft-ietf-roll-routing-metrics-19, IETF Internet-Draft, Mar. 2011, 31 pages.
Winter, et al., "RPL: IPv6 Routing Protocol for Low Power and Lossy Networks", draft-ietf-roll-rpl-19, IETF Internet-Draft; Mar. 2011, 164 pages.

* cited by examiner

EFFICIENT LINK REPAIR MECHANISM TRIGGERED BY DATA TRAFFIC

TECHNICAL FIELD

The present disclosure relates generally to computer networks, and, more particularly, to mainlining links in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

One fundamental problem is that nodes in many LLNs only maintain links in the UPWARD direction (toward a root node), and detect link failures reactively when sending a data packet. If a node has no data packets to send, it will not detect the link failure and will not notify the root that the link is no longer valid. As a result, the root will continue to send traffic down an invalid path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
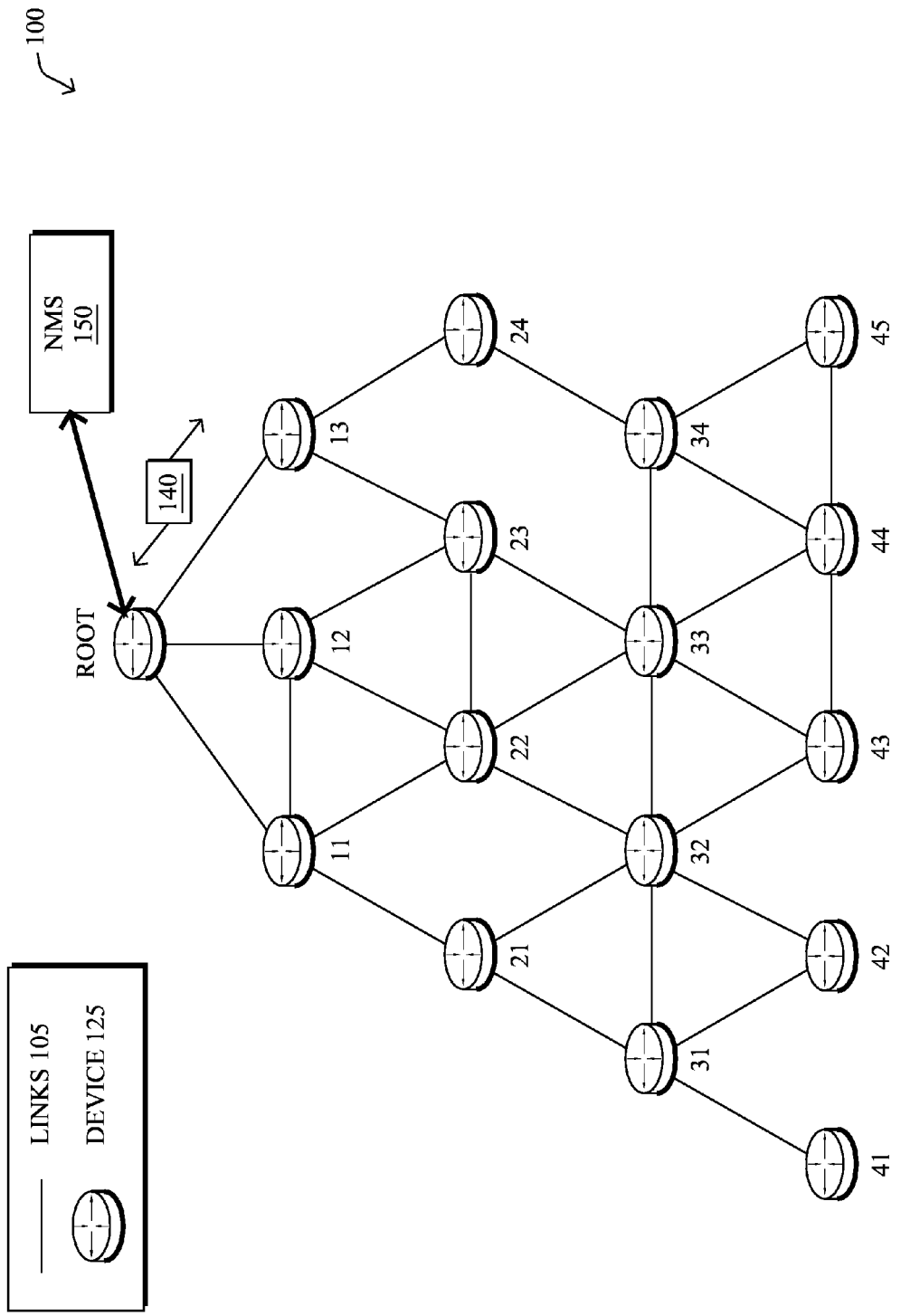
FIG. 1 illustrates an example communication network.

According to one or more embodiments of the disclosure, an intermediate device transmits a data message away from a root device toward a receiver device in a computer network, the data message transmitted by utilizing, in reverse, a link that had been previously selected by the receiver device toward the root device. In response to detecting that the data message did not reach the receiver device, a discovery message is may be sent to one or more neighbor devices, wherein the discovery message carries an identification (ID) of the receiver device and a discovery scope indicating how many hops the discovery message is allowed to traverse to reach the receiver device, and wherein the receiver device, upon receiving the discovery message, triggers a local link repair of the link from the receiver device toward the root device.

According to one or more additional embodiments of the disclosure, a discovery message may be received at a particular device in response to an intermediate device detecting that a data message transmitted away from a root device toward a receiver device in a computer network did not reach the receiver device, wherein the data message was transmitted utilizing, in reverse, a link that had been previously selected by the receiver device toward the root device, wherein the discovery message carries an identification (ID) of the receiver device and a discovery scope indicating how many hops the discovery message is allowed to traverse to reach the receiver device. In response to the receiver device being reachable by the particular device, the discovery message may be forwarded to the receiver device, wherein the receiver device, upon receiving the discovery message, triggers a local link repair of the link from the receiver device toward the root device. Alternatively, in response to the receiver device not being reachable, the discovery scope is decremented, and, if the decremented discovery scope is non-zero, the discovery message may then be forwarded to one or more neighbor devices of the particular device.

According to one or more further additional embodiments of the disclosure, a particular device determines a selected link from itself toward a root device in a computer network, wherein traffic destined away from the root device via the particular device utilizes the selected link in reverse from an intermediate device. Upon receiving a discovery message at the particular device in response to the intermediate device detecting that a data message transmitted over the selected link in reverse did not reach the particular device, wherein the discovery message is received from a neighbor device other than the intermediate device, the particular device triggers a local link repair of the selected link from the particular device toward the root device to determine a new selected link from the particular device toward the root device, wherein traffic destined away from the root device via the particular device utilizes the new selected link in reverse from another intermediate device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 125 (e.g., labeled as shown, "root," "11," "12," . . . "45," and described in FIG. 2 below) interconnected by various methods of communication. For instance, the links 105 may be wired links and/or shared media (e.g., wireless links, PLC links, etc.), where certain nodes 125, such as, e.g., routers, sensors, computers, etc., may be in communication with other nodes 125, e.g., based on distance, signal strength, current operational status, location, etc. In addition, various other devices, such as a head-end application device, Central Intelligence Controller (CIC), or a network management server (NMS) 150 (generally referred to herein as "NMS 150") may be present in the network 100, such as via a WAN reachable by node 11-45 through the root node. Those skilled in the art will understand that any number of nodes, devices, links, etc. may be used in the computer network, and that the view shown herein is for simplicity.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
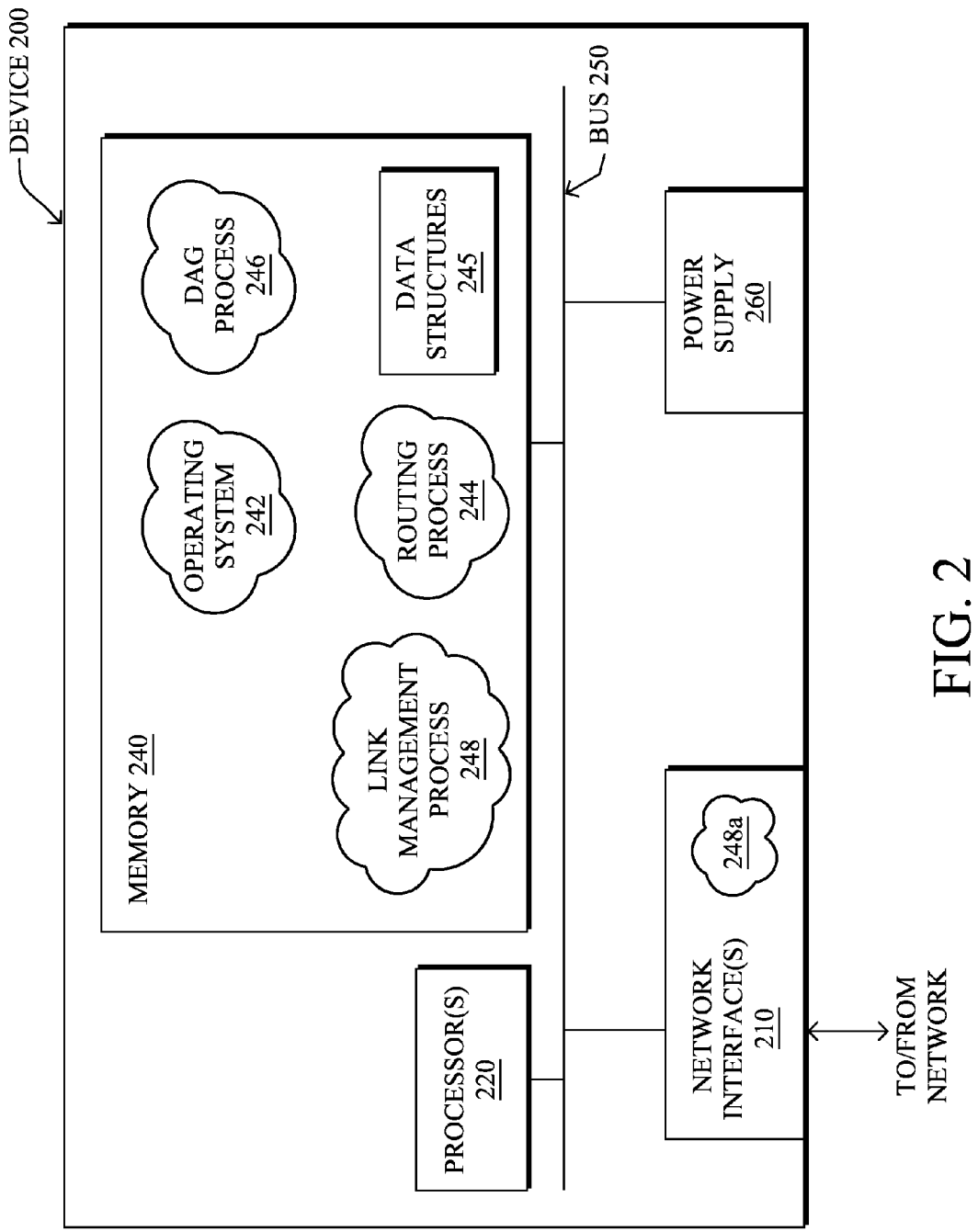
FIG. 2 illustrates an example network device/node.

FIG. 2 is a schematic block diagram of an example node/device 200 that may be used with one or more embodiments described herein, e.g., as any of the devices 125 shown in FIG. 1 above, and also NMS 150. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

It should be noted that PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative link management process 248, as described herein. Note that while link management process 248 is shown in centralized memory 240, alternative embodiments provide for the process to be specifically operated within the network interfaces 210, such as a component of a MAC layer (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-15> by Thubert (Jul. 8, 2011 version) and "The Minimum Rank Objective Function with Hysteresis"<draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
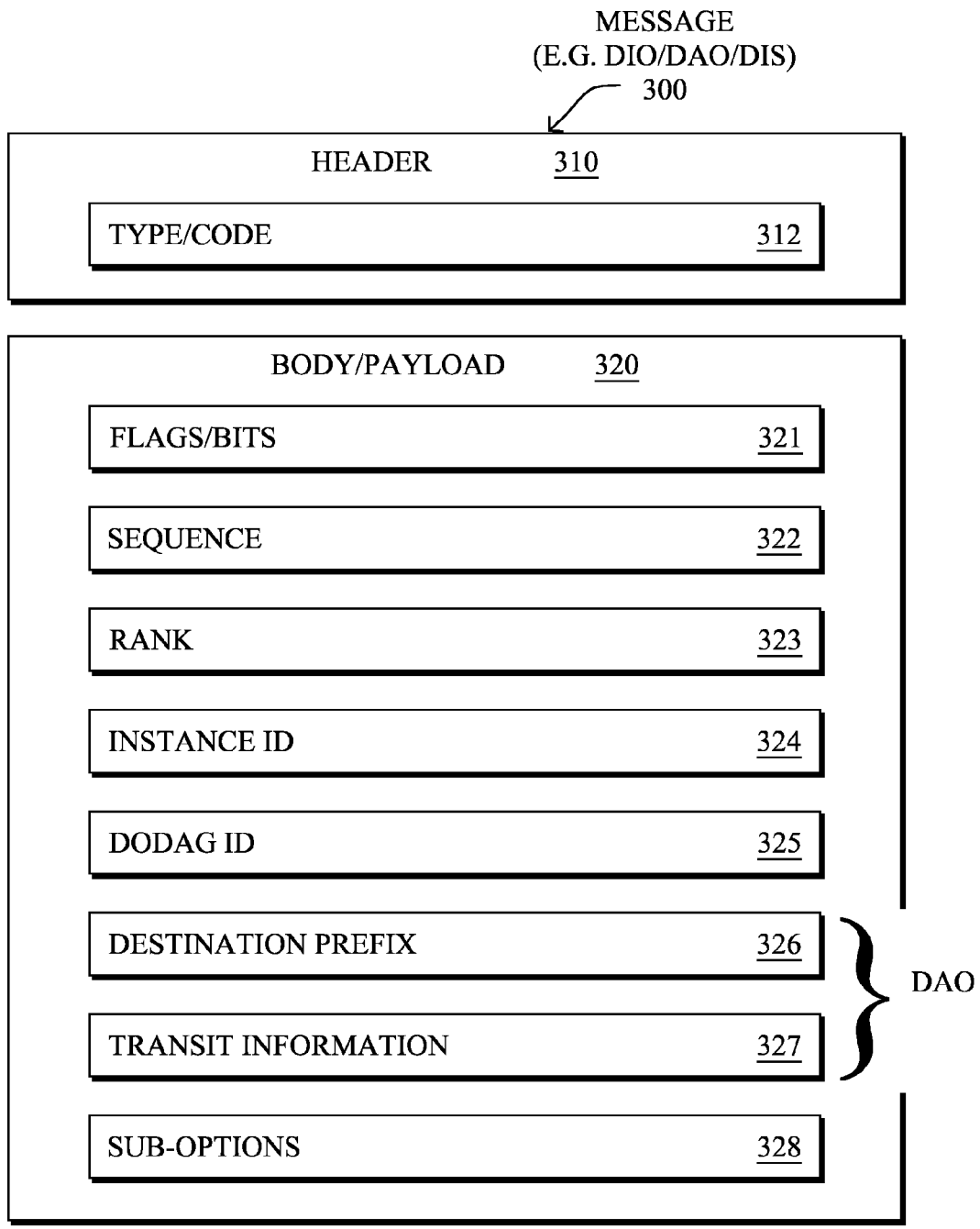
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
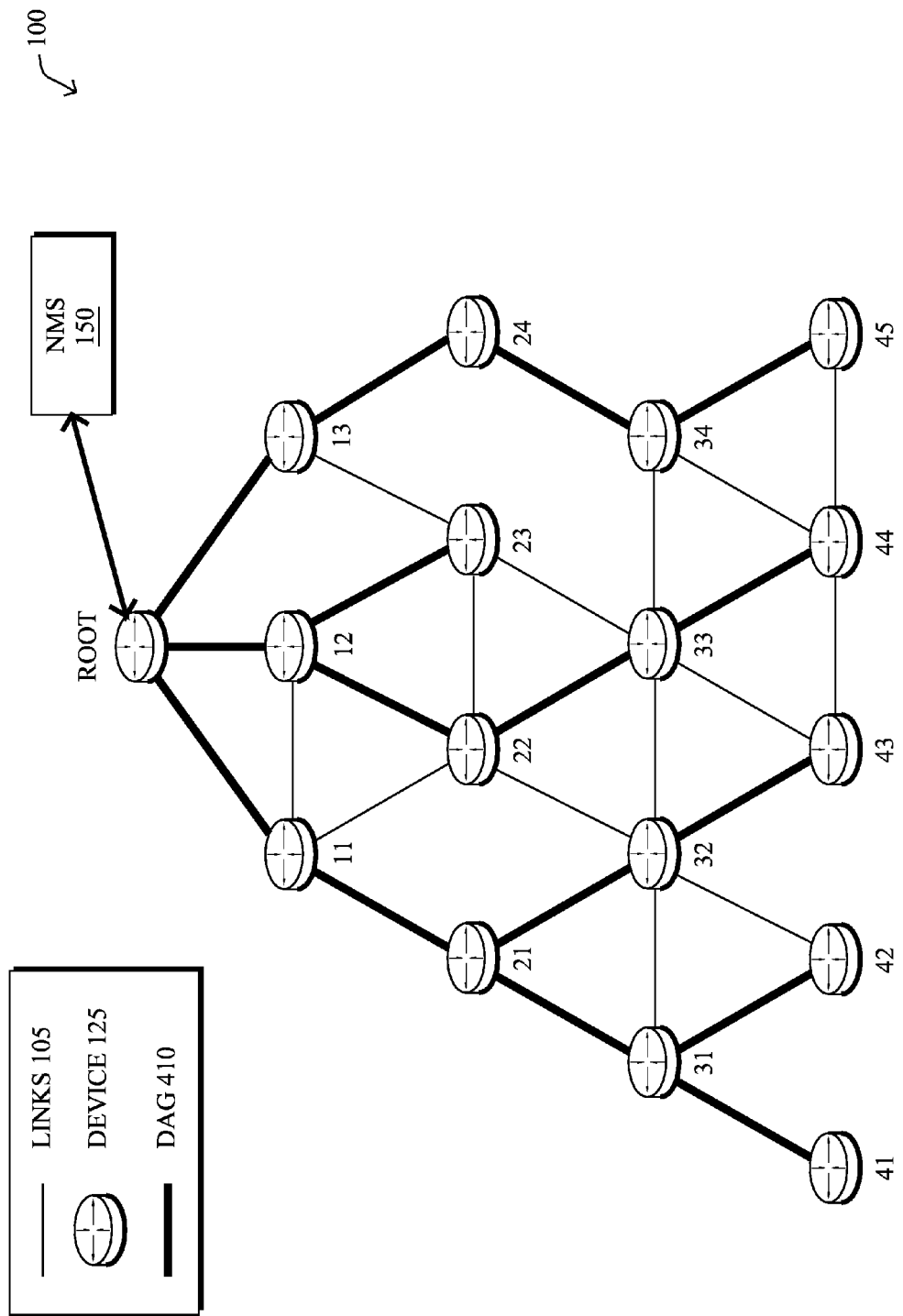
FIG. 4 illustrates an example directed acyclic graph (DAG) in the communication network as in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, one significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

Consider, for example, the illustrative cases of a packet 140 sent in the UPWARD direction (i.e., from a network device in the DAG 410 toward/to the root) and in the reverse DOWNWARD direction, (i.e., away from the root toward a particular network device). First, in the UPWARD direction, assume that link 33-22 is down. When node 33 attempts to forward a packet in the UPWARD direction across link 33-22, the node 33 will detect that the link is down, and attempts to select an alternate next-hop (e.g., node 23) or else trigger a local routing repair to find another set of next-hops to send the packet. This reactive approach works well in the UPWARD direction. However, as described below, such a reactive approach does not work as well in the DOWNWARD direction.

In particular, for the DOWNWARD direction, consider a packet 140 sent from the root to node 33. When using source routing, the root will determine a source route from the root to node 33 (e.g., root-12-22-33), append the source route (e.g., using an IPv6 Routing Header), and forwards the packet to node 12. However, when the packet reaches the failing link (e.g., link 22-33), the packet will be dropped.

The fundamental problem is that nodes only maintain links in the UPWARD direction and detect link failures reactively when sending a data packet (generally to avoid proactive keepalive messages). If node 33 has no data packets to send, it will not detect the link failure and will not notify the root that link 22-33 is no longer valid. As a result, the root will continue to send traffic down an invalid path.

Unlike forwarding packets in the UPWARD direction, it is much more difficult to build and repair a routing topology when detecting link failures in the downward direction. In particular, many LLN protocols (e.g., RPL) build routing topologies in the UPWARD direction and reverse the links for use in the DOWNWARD direction. With such protocols, it is the responsibility of devices to maintain their links towards the root. In particular, if node 22 detects that link 22-33 is down, it cannot simply send a message to node 33 to find a new path.

Note that in certain systems, such as unconstrained IP networks, nodes can send regular proactive keepalive messages, then the routing topology will be kept up-to-date on the timescales of the keepalive period. While a short keepalive period will detect link failures more quickly, doing so is costly in resource-constrained environments such as LLNs (e.g., limited energy and channel capacity). In addition, the root could also maintain multiple (diverse) paths and send multiple copies of the packet along each path to increase the likelihood of at least one being received by the destination. However, applying this technique to all traffic is also costly in resource-constrained environments.

Data-Triggered Link Repair

The techniques herein are directed to a distributed mechanism of discovering a failed link or an improperly utilized link (e.g., from node 22 to node 33) and triggering the downlink node (node 33) to perform a link local repair to maintain end-to-end connectivity. Specifically, according to one or more embodiments of the disclosure as described in detail below, an intermediate device transmits a data message away from a root device toward a receiver device in a computer network, the data message transmitted by utilizing, in reverse, a link that had been previously selected by the receiver device toward the root device. In response to detecting that the data message did not reach the receiver device, a discovery message is may be sent to one or more neighbor devices, wherein the discovery message carries an identification (ID) of the receiver device and a discovery scope indicating how many hops the discovery message is allowed to traverse to reach the receiver device, and wherein the receiver device, upon receiving the discovery message, triggers a local link repair of the link from the receiver device toward the root device.

Illustratively, the techniques described herein may be performed by hardware, software, and/or firmware, such as in accordance with the link management process 248/248a, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the RPL protocol or else various communication protocols, and as such, may be processed by similar components understood in the art that execute those protocols, accordingly. Notably, the techniques herein are not limited to RPL, and could be used with all routing protocols built according to the same paradigm.

Operationally, the techniques herein may be generally based on devices within the network determining a selected link from itself toward a root device in a computer network 100, where traffic destined away from the root device via the particular device utilizes the selected link in reverse, e.g., from an intermediate device. Illustratively, an example routing protocol that operates in this manner is RPL, creating DAGs 410 as described above, though other routing protocols that function similarly in this manner (e.g., other distance vector protocols) may also be utilized.

In accordance with one or more specific embodiments herein, as the routing topology (e.g., DAG 410) is being built, each node may build a cache/list (e.g., data structure 245) of one-hop neighbors, e.g., based on the source address of the DIOs. For example based on the connectivity shown in FIGS. 1 and 4, the neighbor cache of the certain select nodes might be:

Root: 11, 12, 13;
12: Root, 11, 22, 23;
22: 11, 12, 23, 32, 33;
32: 21, 22, 31, 33, 42, 43;
33: 22, 23, 32, 34, 43, 44;
42: 32, 33, 44;
43: 33, 34, 43, 45;
Etc.

Figure 5:
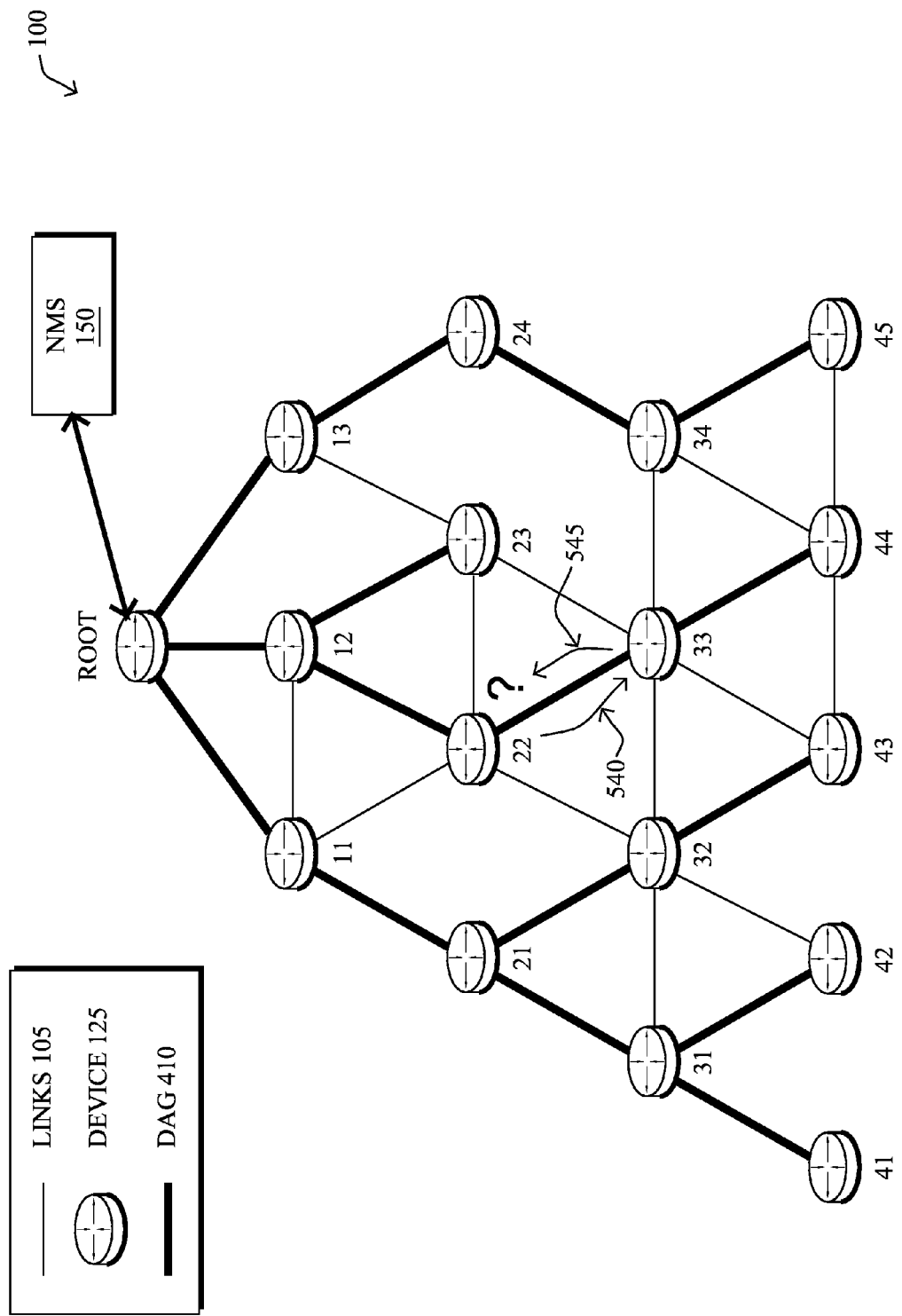
FIG. 5 illustrates an example data message exchange.

As shown in FIG. 5, an intermediate device, e.g., node 22, may attempt to transmit a data message 540 (e.g., a packet 140) away from a root device toward a receiver device (e.g., node 33), which may be the destination of the message or merely another transit/intermediate node. In particular, as noted above, the data message may be transmitted by utilizing, in reverse, a link that had been previously selected by the receiver device toward the root device, e.g., the DAG link. However, based on not receiving a layer-2 acknowledgement (ACK) 545, or based on receiving an explicit error notification, such as an IPv6 NUD, the intermediate device may correspondingly detecting that the data message did not reach the receiver device.

Figure 6A:
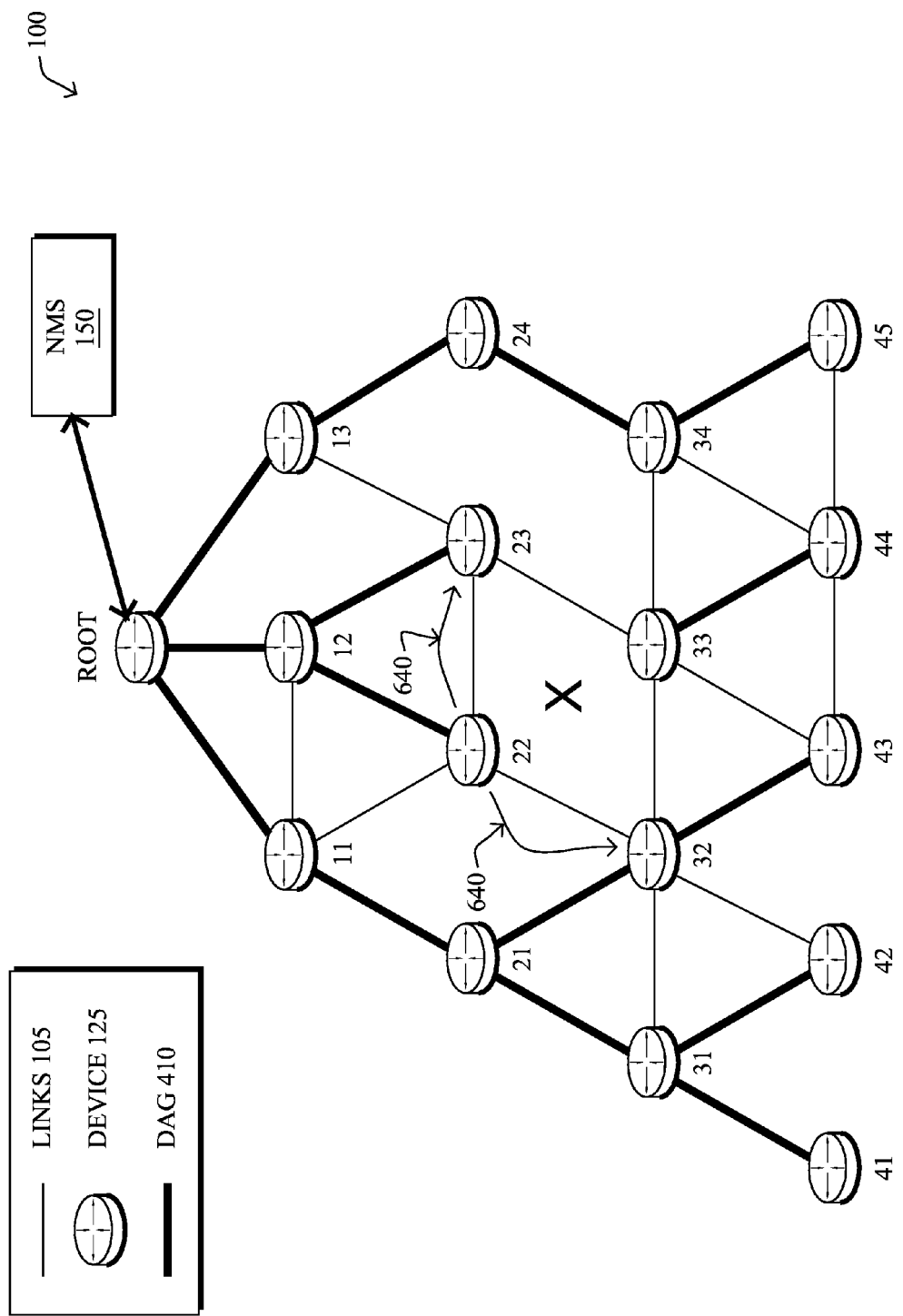
FIGS. 6A-6C illustrate examples of discovery message exchanges.

At this time, the intermediate device (node 22) may drop the original data message 540, and enters into an illustrative "sub-node discovery mode" to take various actions described herein in order to try to somehow "nudge" the sub-node (the receiver device) to "wakeup" and trigger a topology repair. In one embodiment, as shown in FIG. 6A, in response to detecting that the data message 540 did not reach the receiver device, the intermediate device may send a discovery message 640 to one or more neighbor devices (e.g., node 23 and node 32), such as a unicast message to each neighbor, or a multicast (or possibly even broadcast) to the corresponding neighbor nodes. The general goal of the discovery message

640 is to reach the receiver device (e.g., node 33), such that the receiver device may trigger a local link repair of the link from the receiver device toward the root device, to correct the topology, accordingly.

Figure 6B:
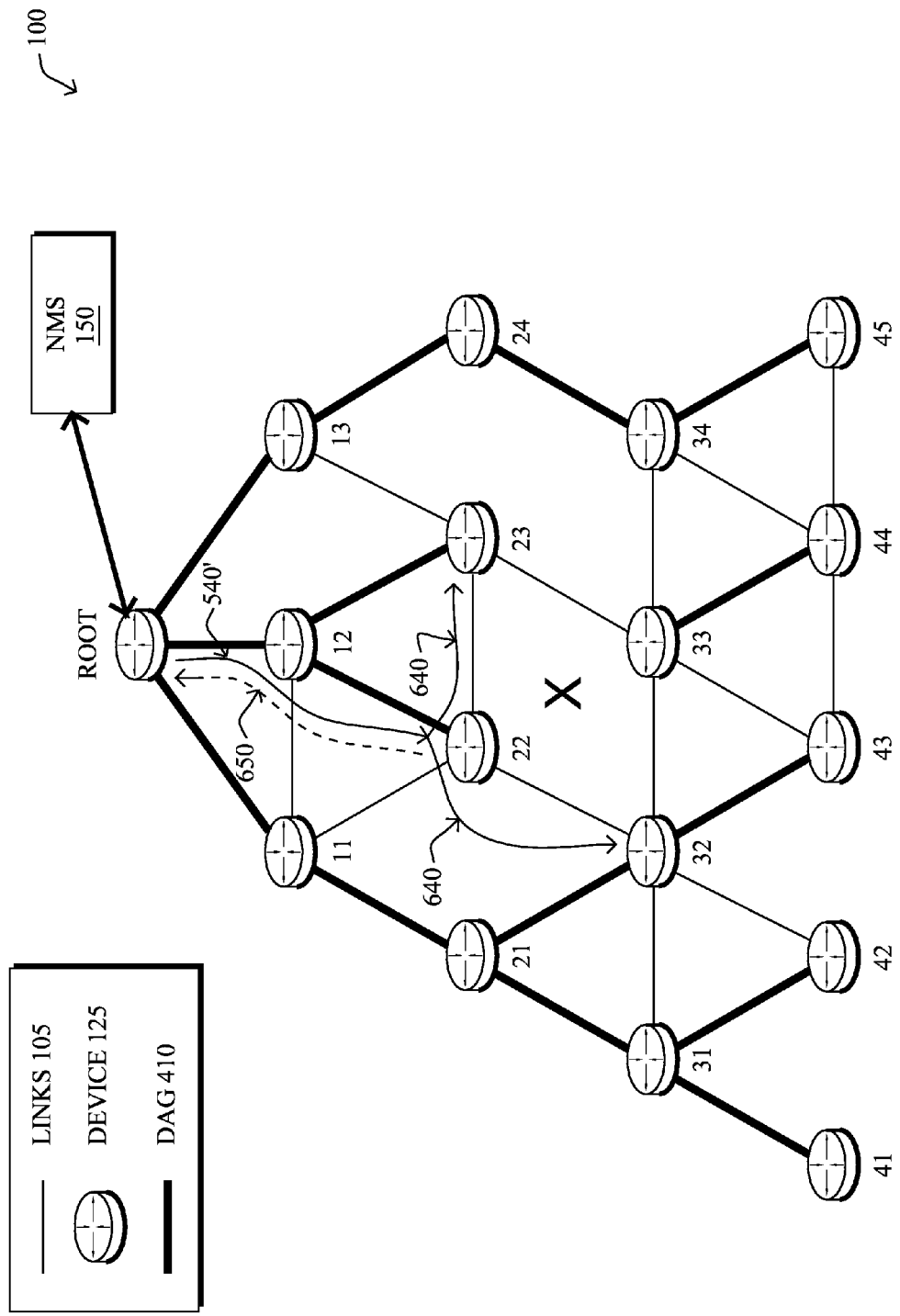

Notably, in another embodiment herein in addition to originating the discovery message 640 by the intermediate device detecting the failed link, that intermediate device may alternatively (or in addition) notify the source of the data message 540 (e.g., the root node or any other nodes in the network when using source routing reactive routing such as with RPL P2P) that the data message did not reach the receiver device. As shown in FIG. 6B, the intermediate device (e.g., node 22) may return a notification 650, such as an Internet Control Message Protocol (ICMP) error message, to the source in order to prompt the source to resend the data message 540' using the same broken path (after caching) after having set a newly defined bit illustratively called the "S" bit (Search bit). In source routing, in particular, the S bit may be hop specific (e.g., in the IPv6 hop-by-hop header), and may be set in the slot right after the intermediate node that originally sent the error message, i.e., corresponding to the receiver device. As such, upon receiving the repeated data message 540', the penultimate hop may encapsulate the data message into a multicast local search packet, that is, discovery message 640 (e.g., with a limited TTL as described below).

Note further that in addition to source route correction, other reasons exist herein for sending the notification 650 to the source. For example, such notifications may be used to keep track of the number of times the route was outdated, to maintain logs that could provide a basis for changing various network parameters at the root level (e.g., increased refresh frequency) or to provide input to a central agent (the NMS 150).

Figure 6C:
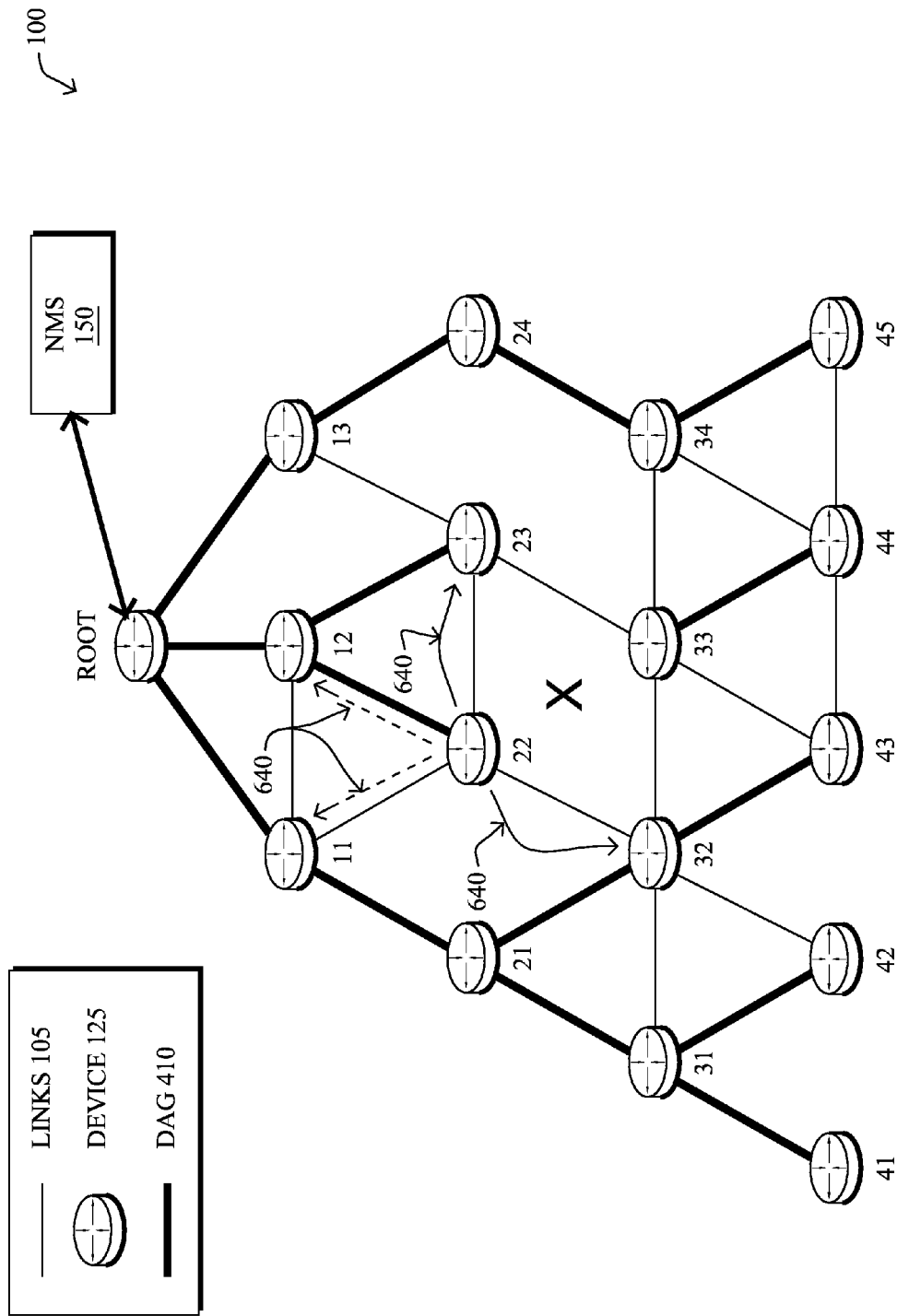

In general, as illustrated in FIG. 6C, a node does not send the discovery message (particularly when unicast) to nodes with a lesser rank, that is, sending the discovery message 540 to only neighbor devices that are as far as or further than the device itself from the root device. In this manner, only those nodes level with or below the particular intermediate node detecting the problem (or simply the neighbor device sending the discovery message) are involved in the sub-node discovery.

Figure 7:
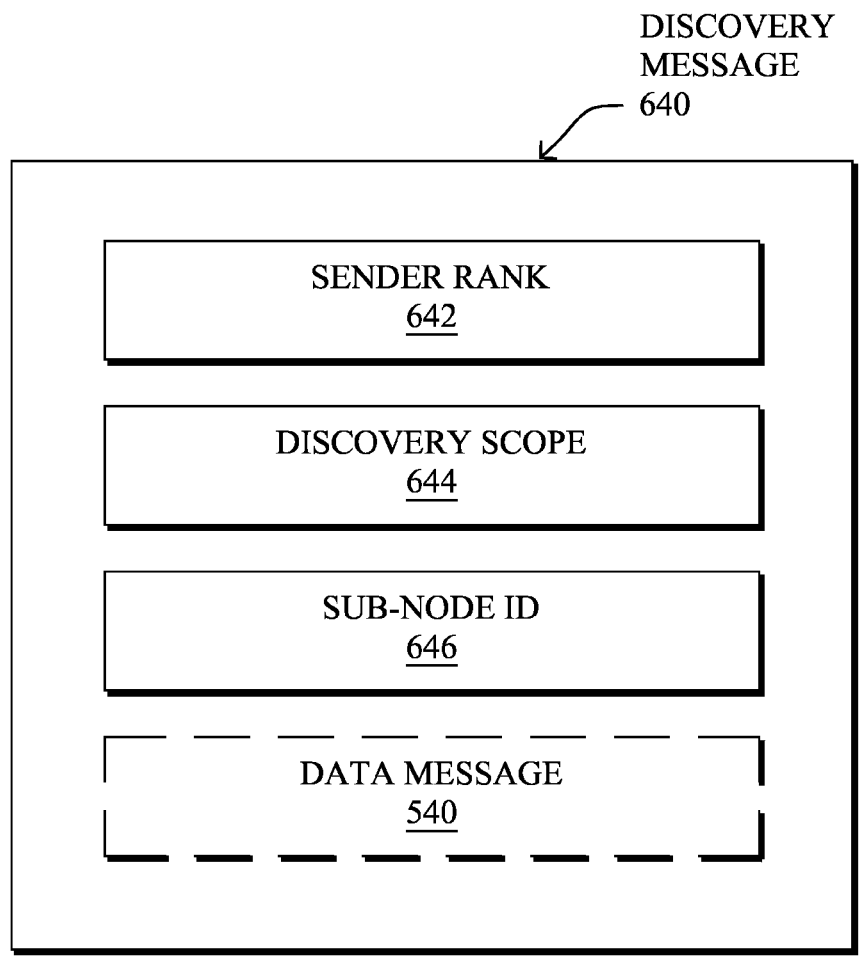
FIG. 7 illustrates an example discovery message format.

Illustratively, with reference to FIG. 7, the discovery message 640 (shown in simplified form) may comprise the sender's rank value 642, a discovery scope value 644 (e.g., "2") indicating how many hops the discovery message is allowed to traverse to reach the receiver device, and the sub-node identifier (ID) 646, such as an address. In addition, the discovery message 640 may, in certain embodiments described herein, encapsulate the original (or retransmission of the original) data message 540, to be decapsulated by the receiver device when/if reached.

Figure 8A:
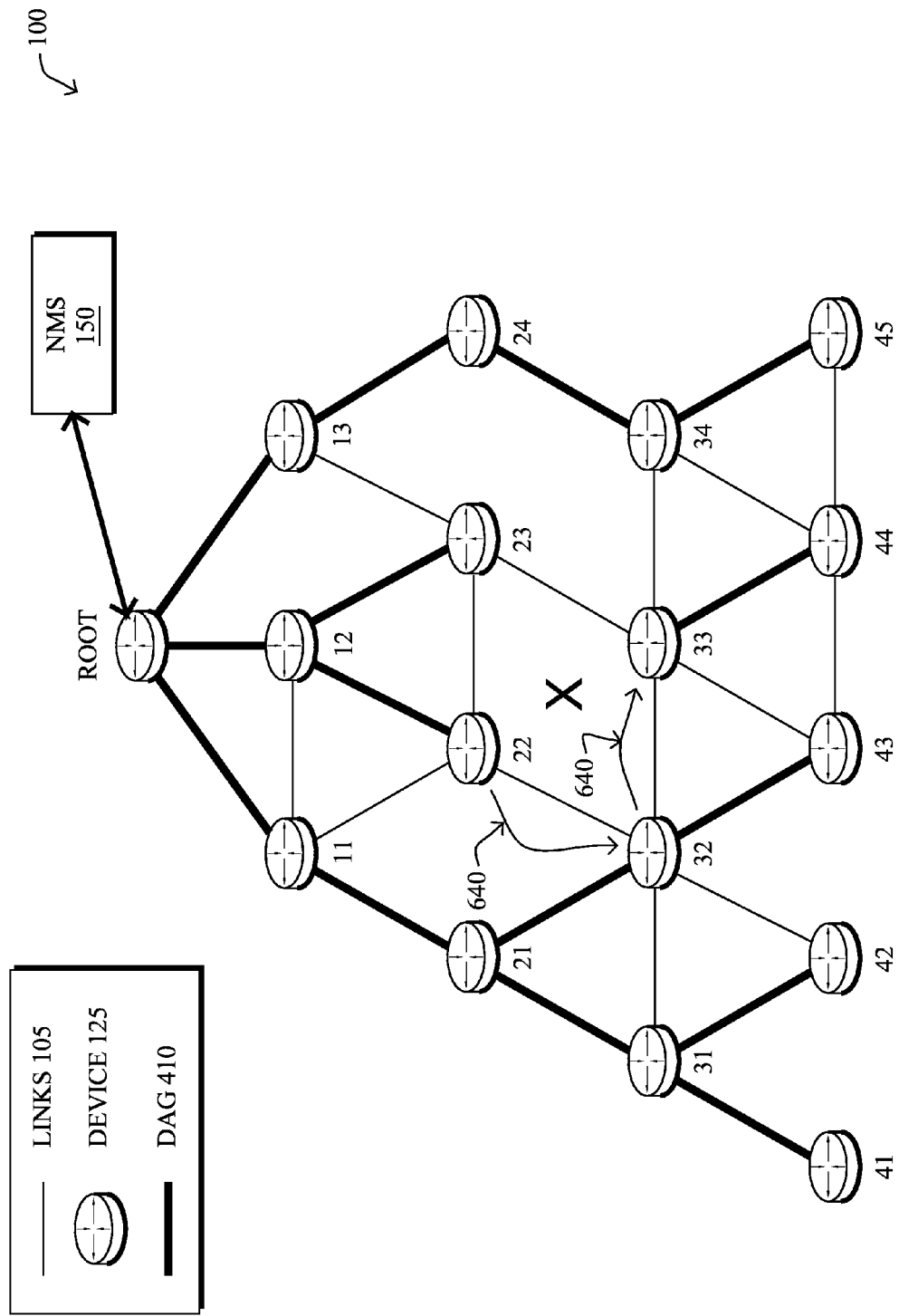
FIGS. 8A-8D illustrate further example discovery message exchanges.

Upon receiving a discovery message 640, neighbor devices (equal or lower nodes) may look into their neighbor cache list and see if there is a match for the sub-node's ID in field 646. That is, the devices receiving the discovery message 640 may be configured to determine whether the receiver device is reachable by the particular device. As shown in FIG. 8A, assuming the link 32-33 exists, then in response to the receiver device being reachable, the neighbor device (node 32) may forward the discovery message directly to the receiver device (e.g., node 33).

Figure 8B:
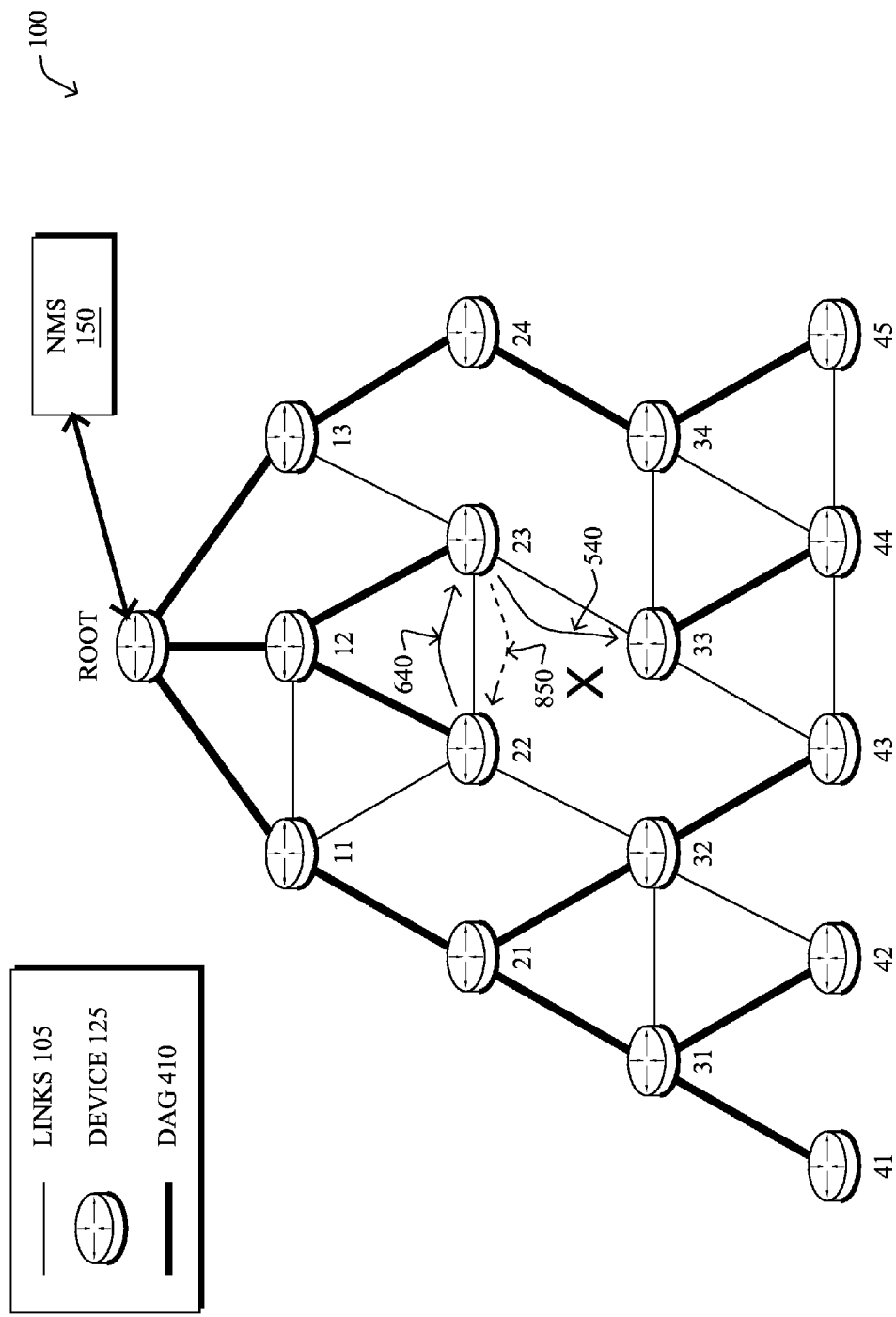

Said differently, a node processing the discovery message 640 (e.g., an encapsulated data message with the S bit set) may find that the "searched" node is present in its routing table or explicit neighbor list. In one embodiment, the device may relay the discovery message 640 (or simply the decapsulated data message 540) to the receiver device, or may alternatively, or in addition, send a reply (notification 850) back to the requestor. For example, assume in FIG. 8B that node 23 also receives the discovery message 640, and in which case (and where the receiver device is reachable over a proper path), node 23 sends a reply message (notification 850) back to the node 22 to inform it of the correct/proper path to the receiver device (e.g., the DAG 410, or else the link 23-23).

Figure 8C:
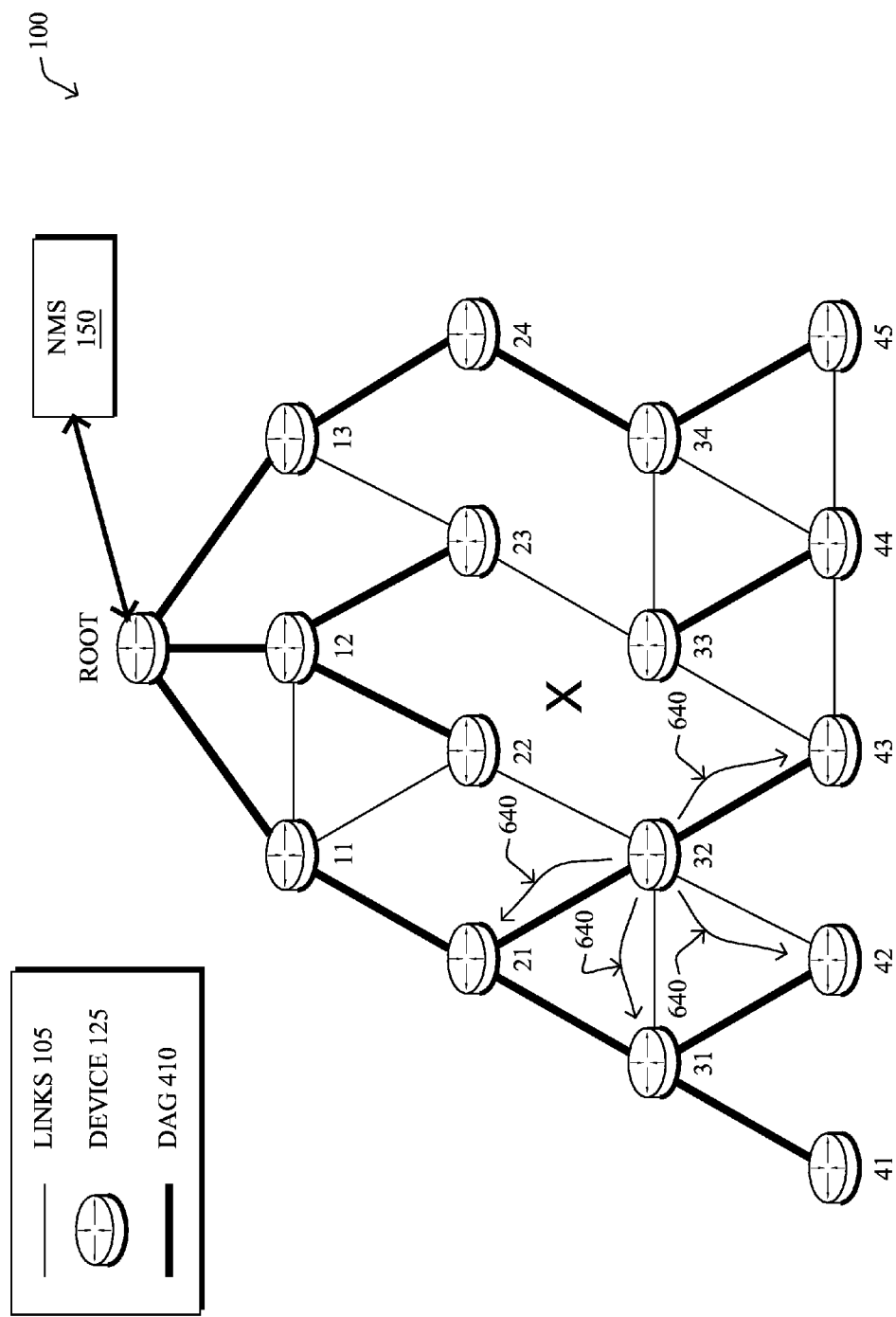

In response to the receiver device not being reachable, however, as shown in FIG. 8C (assuming the link 32-33 is not available, nor the link 22-23, for illustration purposes), the neighbor device (e.g., node 32) may decrement the discovery scope 644, and, if the decremented discovery scope is non-zero, may forward the discovery message 640 to one or more further neighbor devices (e.g., except parents) of the particular device.

Illustratively, the discovery scope value 644 may be pre-configured as the routing topology is built (e.g., a DAG with RPL), such as a discovery scope (or time-to-live, "TTL") value of 2. The discovery scope parameter can be provided to each node in the network by a dynamic host configuration protocol (DHCP) server, the NMS 150, etc. In certain embodiments, the discovery scope may be dynamically computed by a head-end application (e.g., on the NMS 150) by observing the success/failure rate of the techniques herein. By having a discovery scope, propagation of the discovery messages 640 is limited (so as not to flood the entire network), creating a boundary of the search.

Figure 8D:
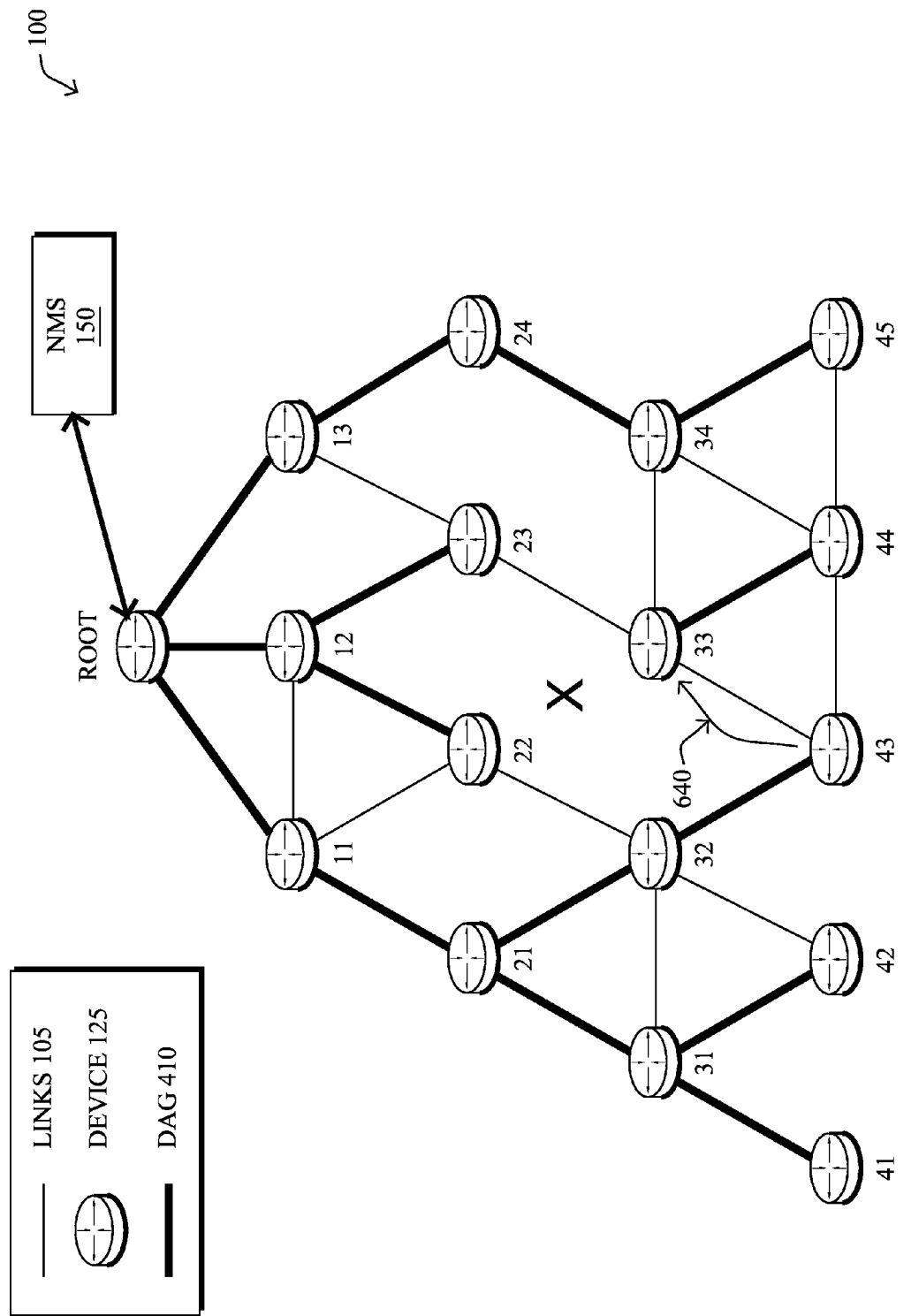

Referring still to FIG. 8C, node 32 receives and processes the message, and since node 33 is not in its cache, node 32 will regenerate and send the discovery message 640 to nodes 21, 31, 42, and 43, with decremented discovery scope=1. (Note that the message 640 is not sent to node 22 again, as it was the sender.) Now, with reference to FIG. 8D, node 43 will find node 33 in its cache, and will send the discovery message 640 with (discovery scope=0) and destination address as node 33.

Figure 9:
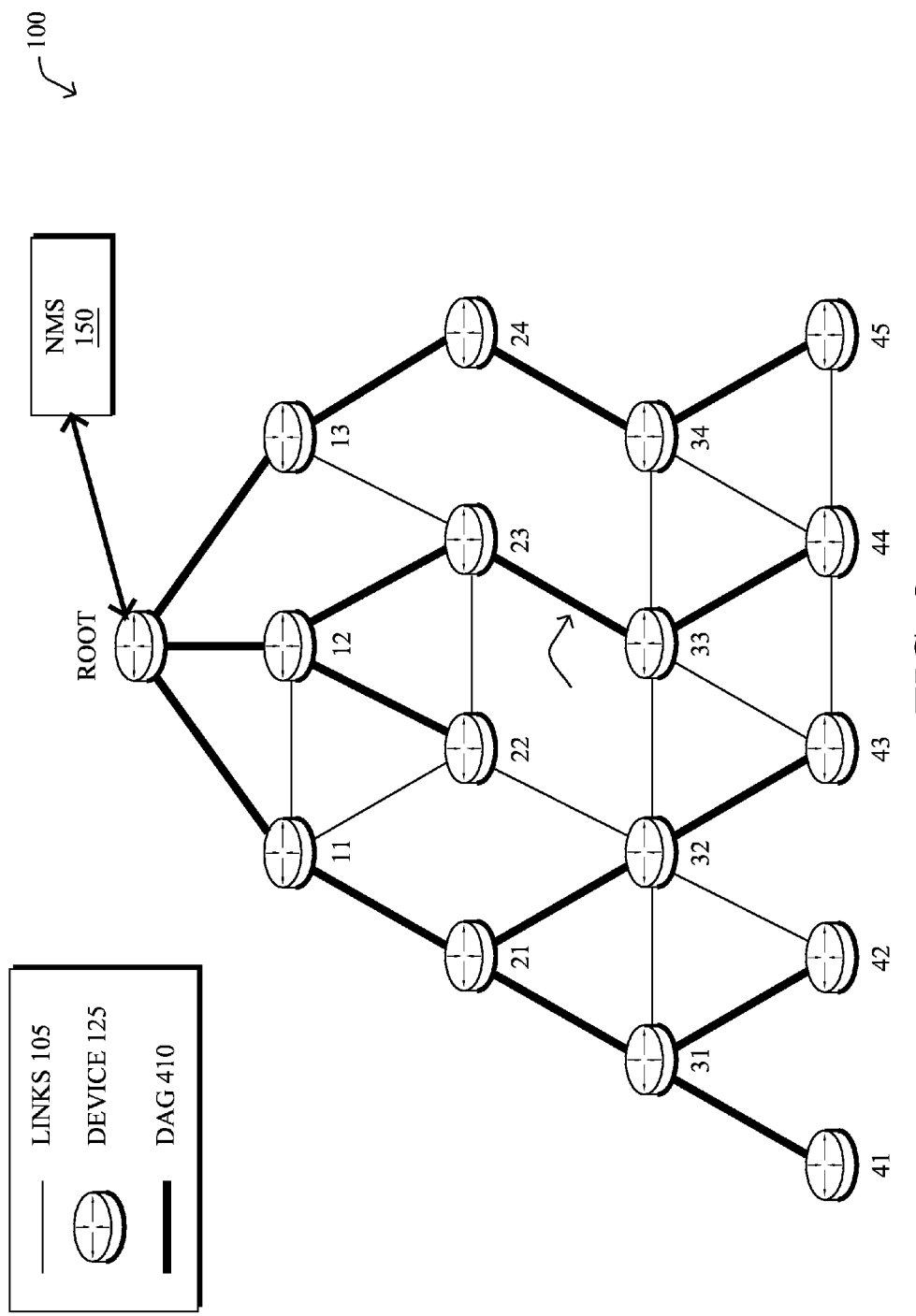
FIG. 9 illustrates an example local link repair.

Upon receiving this discovery message, as shown in FIG. 9, node 33 triggers a link-topology (local link) repair of the selected link toward the root device, thus selecting a new link for the topology (e.g., link 33-23 for DAG 410). Notably, nodes propagating the discovery message 640 will eventually stop the relay of the discovery message when the discovery scope (TTL) value reaches 0.

Note also that if the discovery message 640 carried an encapsulated data message 540, this may be decapsulated by the receiver device, and processed accordingly (e.g., forwarded or locally processed). That is, in one or more specific embodiments, the entire data message 540 may be embedded in the discovery message 640, rather than dropping it. Although the size of the discovery message is correspondingly increased (and thus the bandwidth usage), the message would generally reach its destination, thus avoiding having the original source resend its lost/dropped message.

Additionally, it is possible that the sub-node (receiver device) to be discovered may be beyond the configured search scope. In this case, the link topology will not be repaired as the targeted node will not receive the discovery message 640. In this case, upon determining that the discovery message did not reach the receiver node, the intermediate node triggering the sub-node discovery (node 23) can increment the discovery scope value 644, such that is it increased for a subsequently sent discovery message to that same receiver (e.g., trying again, or else in response to a next received data message destined via the failed receiver device link).

Figure 10A:
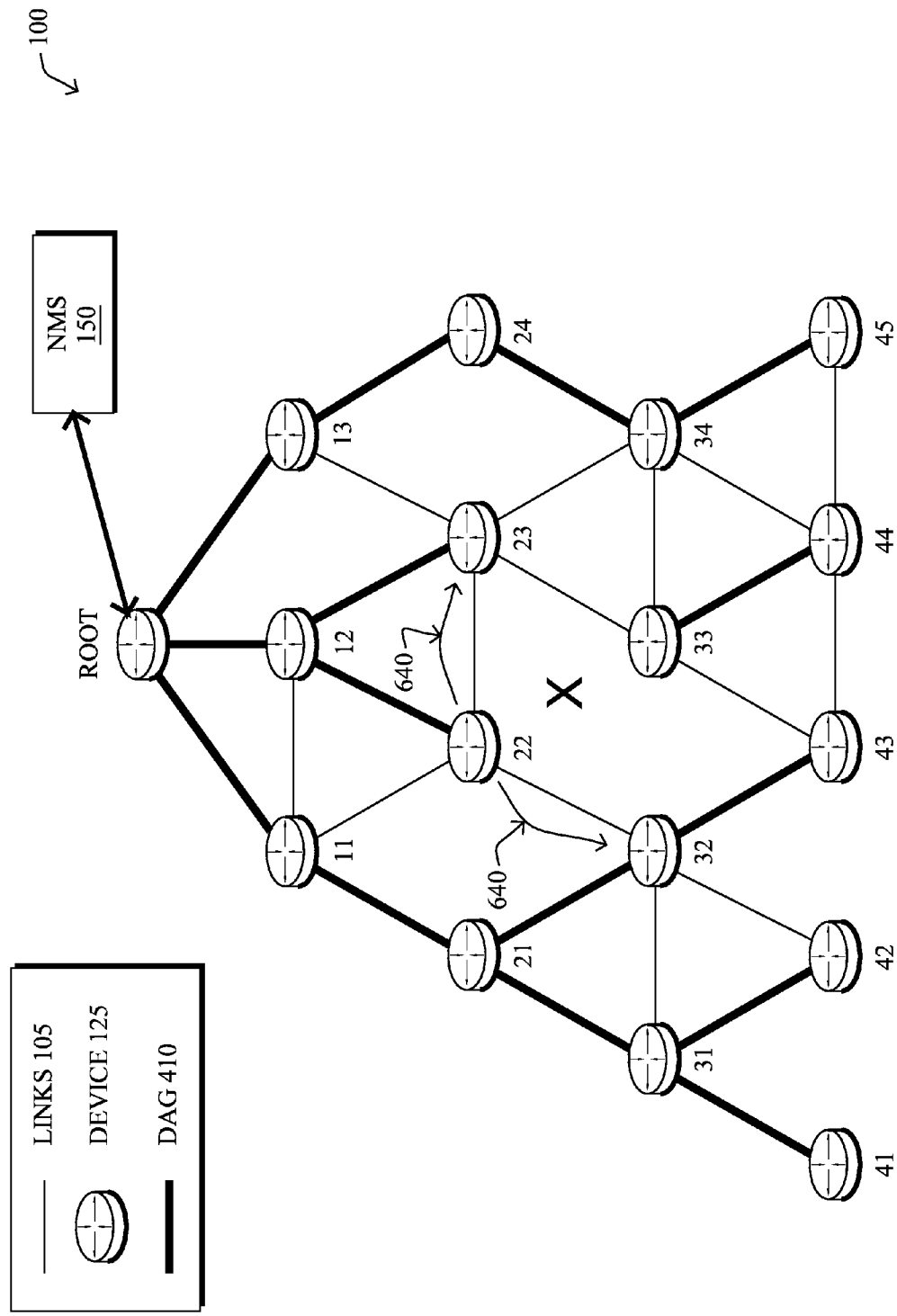
FIGS. 10A-10C illustrate an example of serialized discovery message exchanges.
Figure 10B:
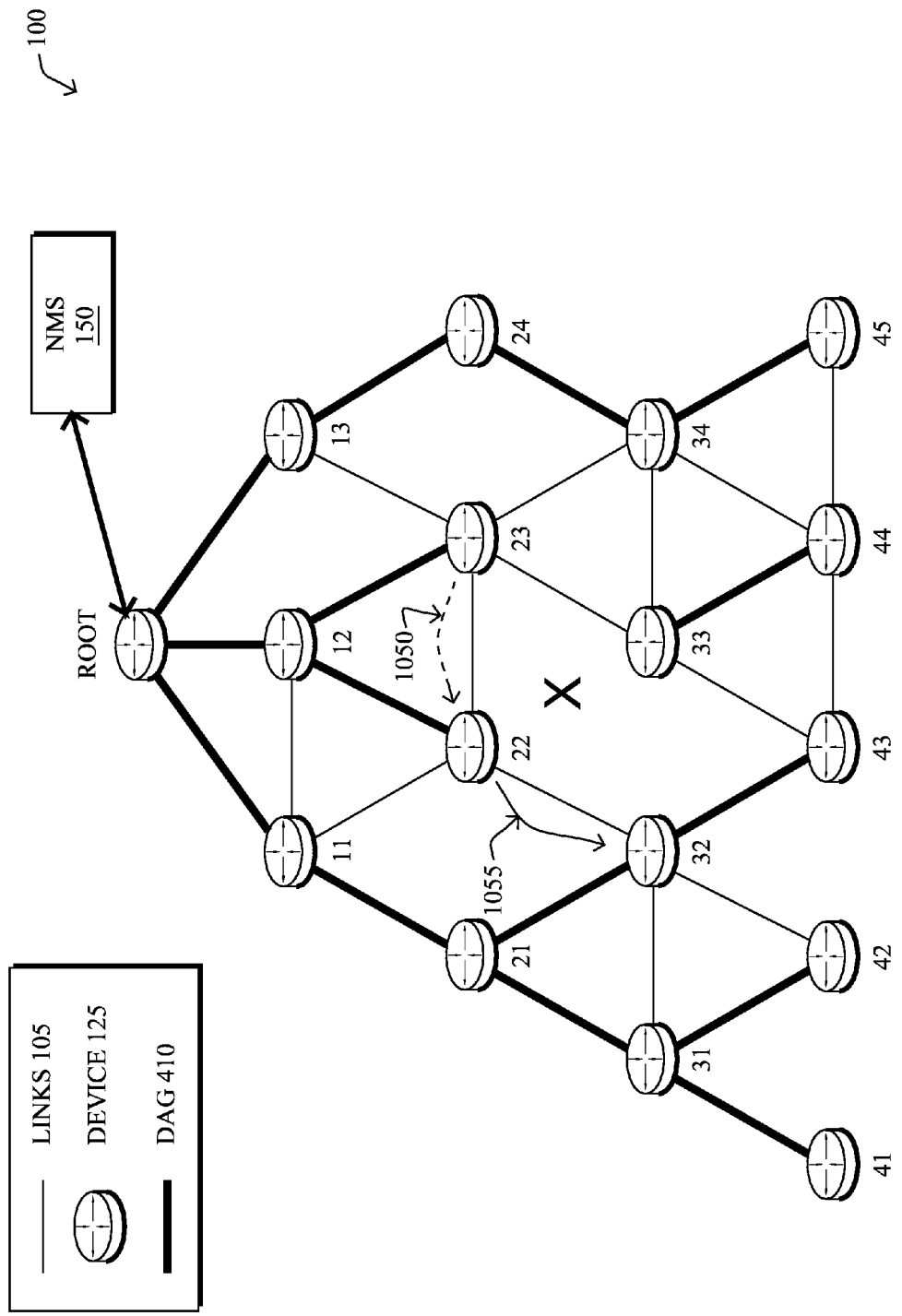
Figure 10C:
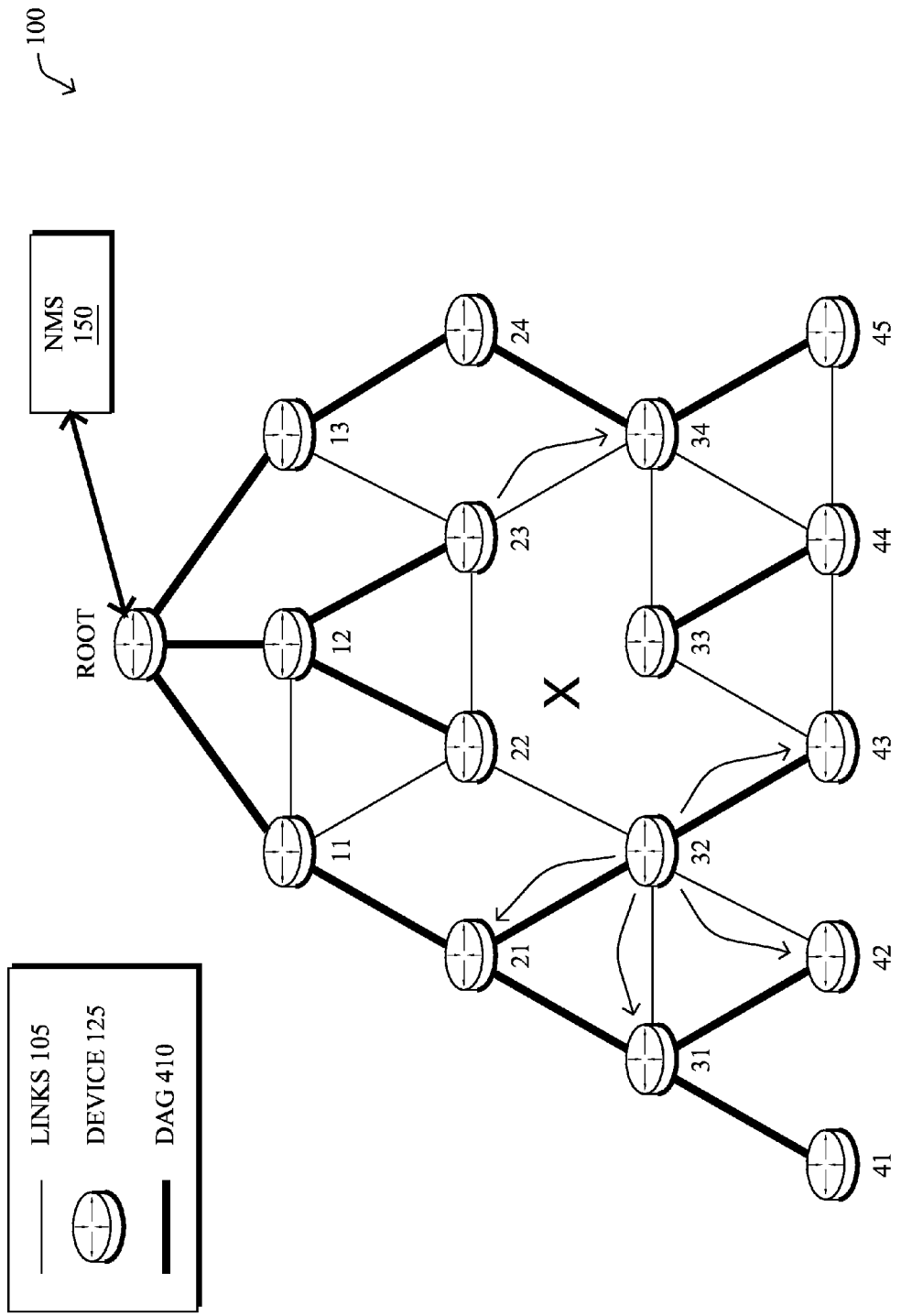

In yet another embodiment described herein, to limit the sub-mode discovery mechanism, nodes transmitting discovery messages may "serialize" their search, i.e., sending the discovery message one discovery scope "level" at a time. For instance, each neighbor device receiving the discovery message checks whether it can reach the receiver device, and if so, notifies the intermediate device, as mentioned above. If it cannot reach the receiver device, then the neighbor device delays a configured time before forwarding the discovery message to a next discovery scope level, unless receiving an instruction sent to neighbor device to cease forwarding the discovery message in response to the previous message sender receiving a notification that a particular neighbor device can reach the receiver device. FIG. 10A illustrates an example, where if a node sends k discovery messages n1, n2, n3, ..., nk, upon receiving the message each node does a search in its cache and arms a timer T. If one of the k nodes finds the searched node (e.g., node 33), as shown in FIG. 10B, that node sends a newly defined message 1050 to the requester (for example node 32 would send such a message) indicating that the searched node was found. Upon receiving that newly defined message 1050, the requester sends a link local message 1055 cancelling its original search request, thus stopping the process. On the other hand, if in FIG. 10B there were no nodes that could reach the receiver device, as in the topology of FIG. 10C, then those nodes may also further send the discovery message upon expiration of the timer T. Using such a timer-based search allows for reducing the number of searches in very dense environments, even if its slows down the repair (which may not be an issue). Note that the value of T may be dynamically computed according to the number of nodes to which the discovery messages may be sent.

Note that the downward-link problem also directly relates to erroneous source-route computation (e.g., logic errors, routing table corruption, missing DAOs, etc.). That is, when source-routing is used, there might be a number of reasons why such a source routed path may become inactive. For instance, in addition to the link failing without the receiver node being aware of the failure, other causes for source-routing failures may include, among others, where the link (e.g., the 22-33 link) may become weak or fail, and the receiving node 33 may have selected node 23 as its new best next hop, but where the source-routing device (e.g., the root node) is unaware of the change.

For example, routing protocols generally have mechanisms to inform other nodes of routing topology changes. For the sake of illustration, Link State would flood a new LSA (Link State Advertisement) whereby a distance vector routing protocol such as RPL would send a control plane message (e.g., a DAO) that would inform the nodes of the routing topology change. Upon receiving such a message, the receiving node (e.g., the root node) would update its network database to reflect the change and compute a new source-routed path upon receiving a packet destined to that node (or pre-compute such a path). Unfortunately, such notifications may be lost, not properly processed by the receiving nodes, the routing entry may not be updated (a corrupted routing table), etc., thus resulting in the root node (or other source-routing node) constantly sending data messages 540 to a node along a broken source-routed path without any way to repair the DOWNWARD path. (Note that even with DAO acknowledgement, there are a number of reasons why such notifications may still be improperly processed or lost in the network.)

Figure 11A:
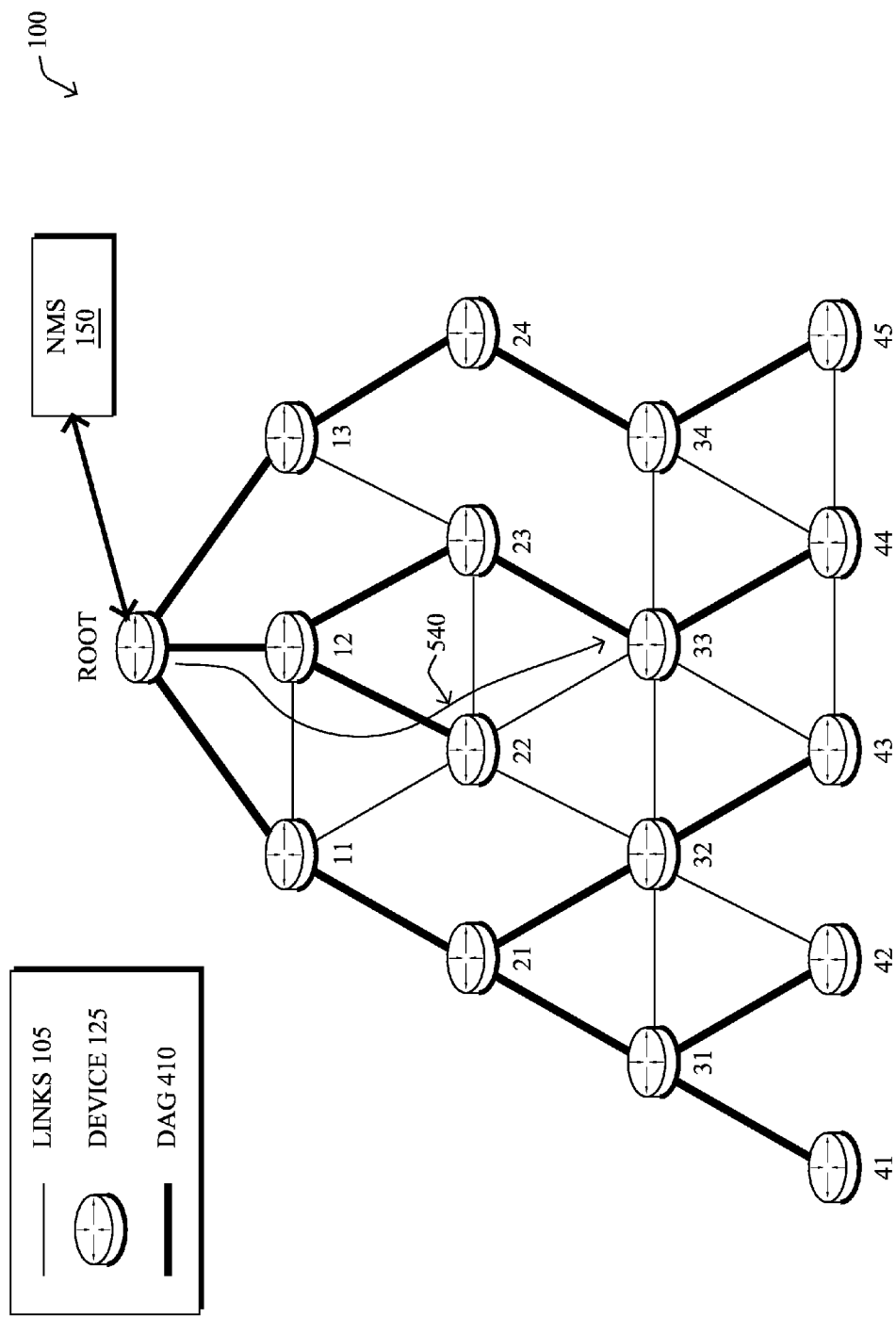
FIGS. 11A-11B illustrate an example of improper path utilization.

As shown in FIG. 11A, for instance, when a data message 540 is sent from the root node to node 33 along the root-12-22-33 source-routed broken path, when the last node/router along the path sends the packet (node 22), two situations may occur. First, the link (22-33) is still operational, but not used anymore by the next-hop node (node 33) which has selected a new best path (i.e., an improper use of the unselected link). Second, the link may have failed, in which case the link failure will be detected (lack of ACK, NUD) by the sending node, and the techniques above may be again utilized.

Figure 11B:
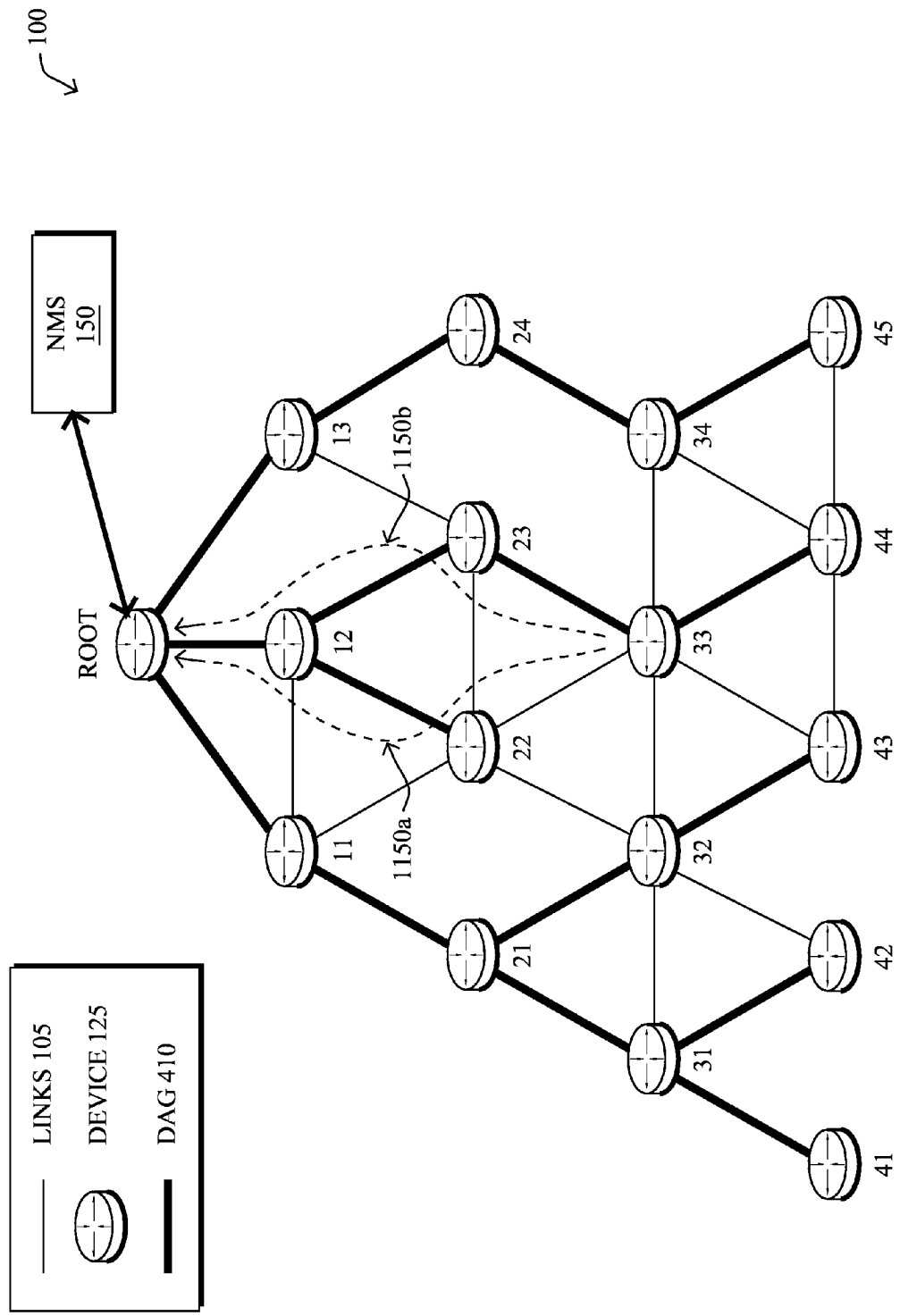

According to one or more embodiments herein, therefore, additional components are described herein with regard to the first case, where node 33 would receive a packet (data message 540) from a non-preferred next hop (i.e., over an improper, unselected link), as shown in FIG. 11A. Should this occur, then as shown in FIG. 11B, the receiver device (node 33) may sends a notification 1150 back to the intermediate device, or more particularly to the source routing originator/sender (or the entire network in the case of a link state protocol), such as a new DAO message in the case of RPL, notifying the device(s) of improper use of the unselected link and thus triggering a database update and new source-route path computation by the source device (e.g., the root node). The source device (e.g., root node) may then try to process this notification 1150, and attempts to correct the source-route path.

Note, however, that it is possible that the source-routed path may still point to the improper link (i.e., the same erroneous path) due to a processing error (logic error) or a corrupted routing table. Upon detecting this condition, that is, determining that more than a configured number of improper uses of unselected links have occurred at the particular receiver device, then a management device (e.g., NMS 150) may be notified of the improper uses. In this case, the management device may then take more appropriate corrective action regarding the improper uses, such as performing a software upgrade to correct spurious code.

Figure 12:
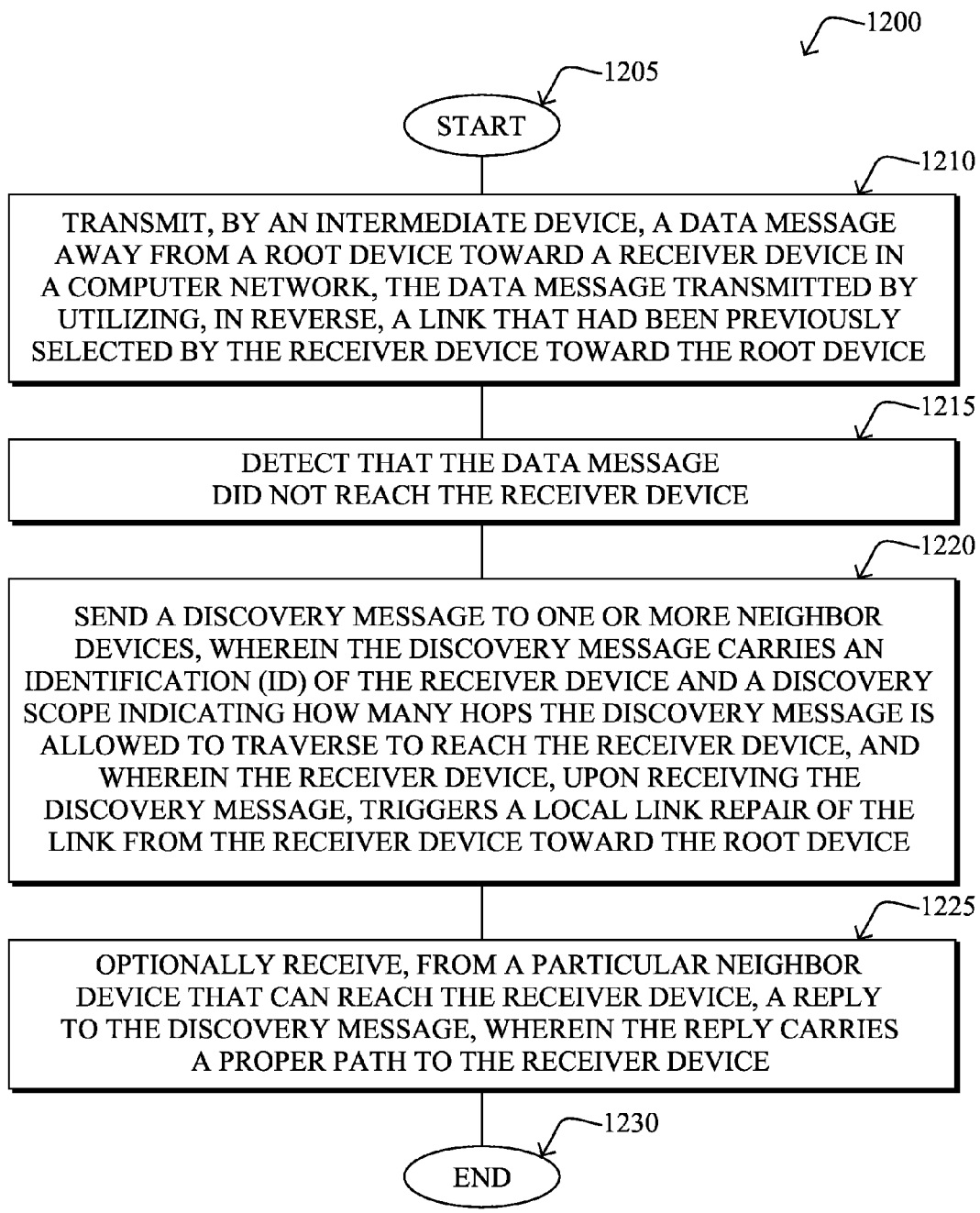
FIG. 12 illustrates an example simplified procedure for efficient link repair mechanism triggered by data traffic in a computer network, particularly from the perspective of the device utilizing the broken/improper link.

FIG. 12 illustrates an example simplified procedure for efficient link repair mechanism triggered by data traffic in a computer network in accordance with one or more embodiments described herein, particularly from the perspective of the device utilizing the broken/improper link (e.g., node 22 above). The procedure 1200 may start at step 1205, and continues to step 1210, where, as described in greater detail above, an intermediate device (e.g., node 22) transmits a data message 540 away from a root device toward a receiver device (e.g., node 33) in a computer network 100, the data message transmitted by utilizing, in reverse, a link that had been previously selected by the receiver device toward the root device.

Upon detecting in step 1215 that the data message did not reach the receiver device, such as through a NUD or no ACK, the intermediate device may send a discovery message 640 in step 1220 to one or more neighbor devices, wherein the discovery message carries an ID 646 of the receiver device and a discovery scope 644 indicating how many hops the discovery message is allowed to traverse to reach the receiver device. Note that as mentioned above, the source device (e.g., the root) may resend the data message 540, or else the intermediate device detecting the broken link may self-initiate the discovery messages, accordingly. As described herein (e.g., and with reference to FIG. 14), the receiver device, upon receiving the discovery message, thus triggers a local link repair of the link from the receiver device toward the root device. Optionally (e.g., in certain specific embodiments and situations), in step 1225, the intermediate device may receive a reply to the discovery message from a particular neighbor device that can reach the receiver device, wherein the reply carries a proper path to the receiver device. The procedure 1200 illustratively ends in step 1230.

Figure 13:
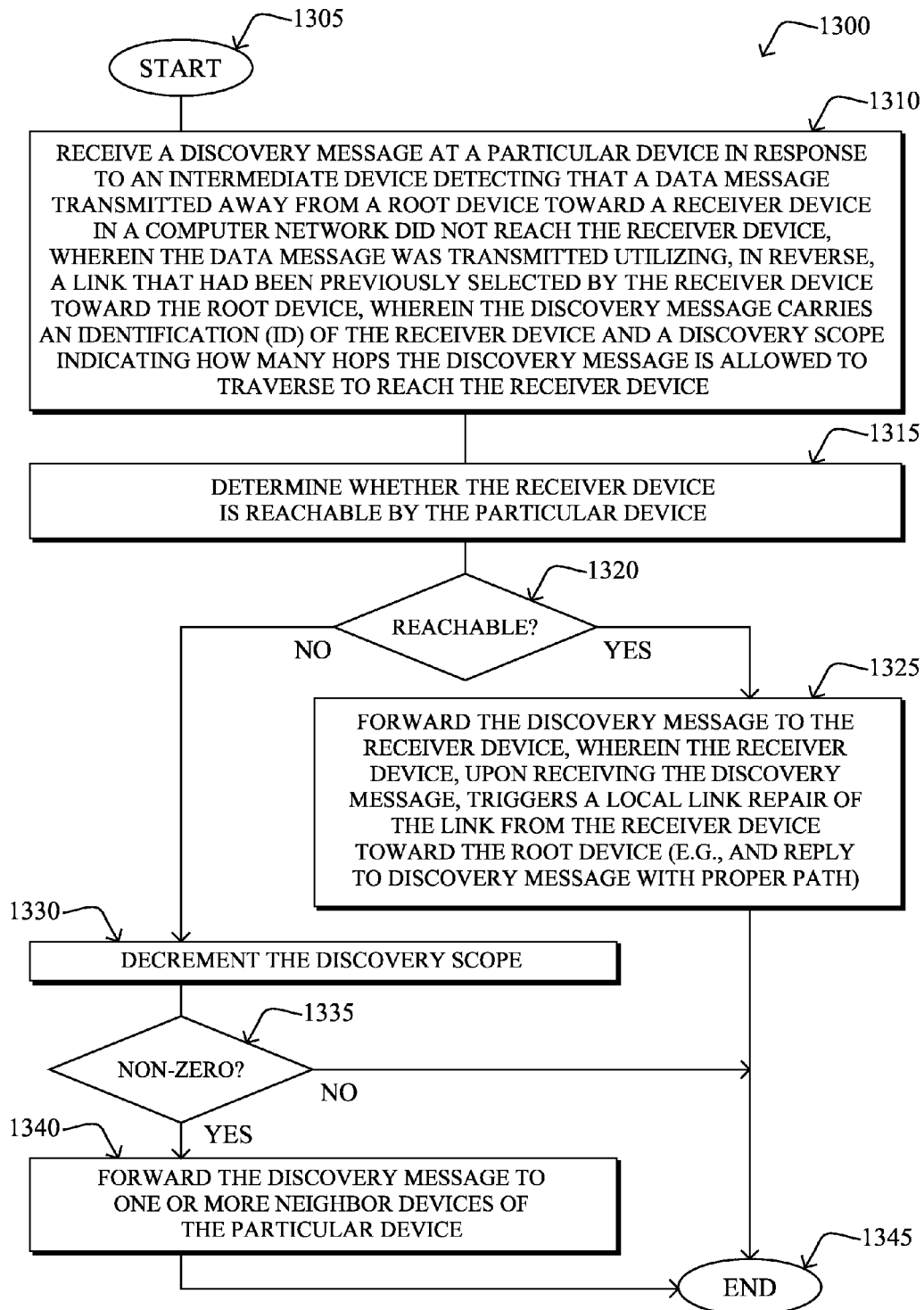
FIG. 13 illustrates an example simplified procedure for efficient link repair mechanism triggered by data traffic in a computer network, particularly from the perspective of a neighbor device attempting to reach the receiver device.

In addition, FIG. 13 illustrates an example simplified procedure for efficient link repair mechanism triggered by data traffic in a computer network in accordance with one or more embodiments described herein, particularly from the perspective of a neighbor device attempting to reach the receiver device (e.g., device 32). The procedure 1300 may start at step 1305, and continues to step 1310, where, as described in greater detail above, the neighbor device (a particular device) may receive a discovery message 640 in response to an intermediate device (e.g., nod 22) detecting that a data message 540 transmitted away from a root device toward a receiver device (e.g., node 32) in a computer network 100 did not reach the receiver device, wherein the data message was transmitted utilizing, in reverse, a link that had been previously selected by the receiver device toward the root device. Again, the discovery message 640 carries an ID 646 of the receiver device and a discovery scope 644 indicating how many hops the discovery message is allowed to traverse to reach the receiver device.

In step 1315, the particular/neighbor device may determine whether the receiver device is reachable by the particular device, and if determined that it is in step 1320, then in step 1325 the particular device may forward the discovery message 640 to the receiver device, where the receiver device, upon receiving the discovery message, triggers a local link repair of the link from the receiver device toward the root device. Note also that in step 1325, the particular device in certain embodiments and situations may reply to discovery message with a proper path 850, as noted above.

If, on the other hand, it is determined at step 1320 that the receiver device is not reachable, then in step 1330, the particular/neighbor device may decrement the discovery scope value 644, and if non-zero in step 1335, then in step 1340 may forward the discovery message to one or more further neighbor devices of the particular device to continue searching for the receiver device (e.g., in serialized manner as described above in one specific embodiment). The procedure 1300 may then end in step 1345, having transmitted the discovery message 640, or else in response to dropping the message when the discovery scope reaches zero.

Figure 14:
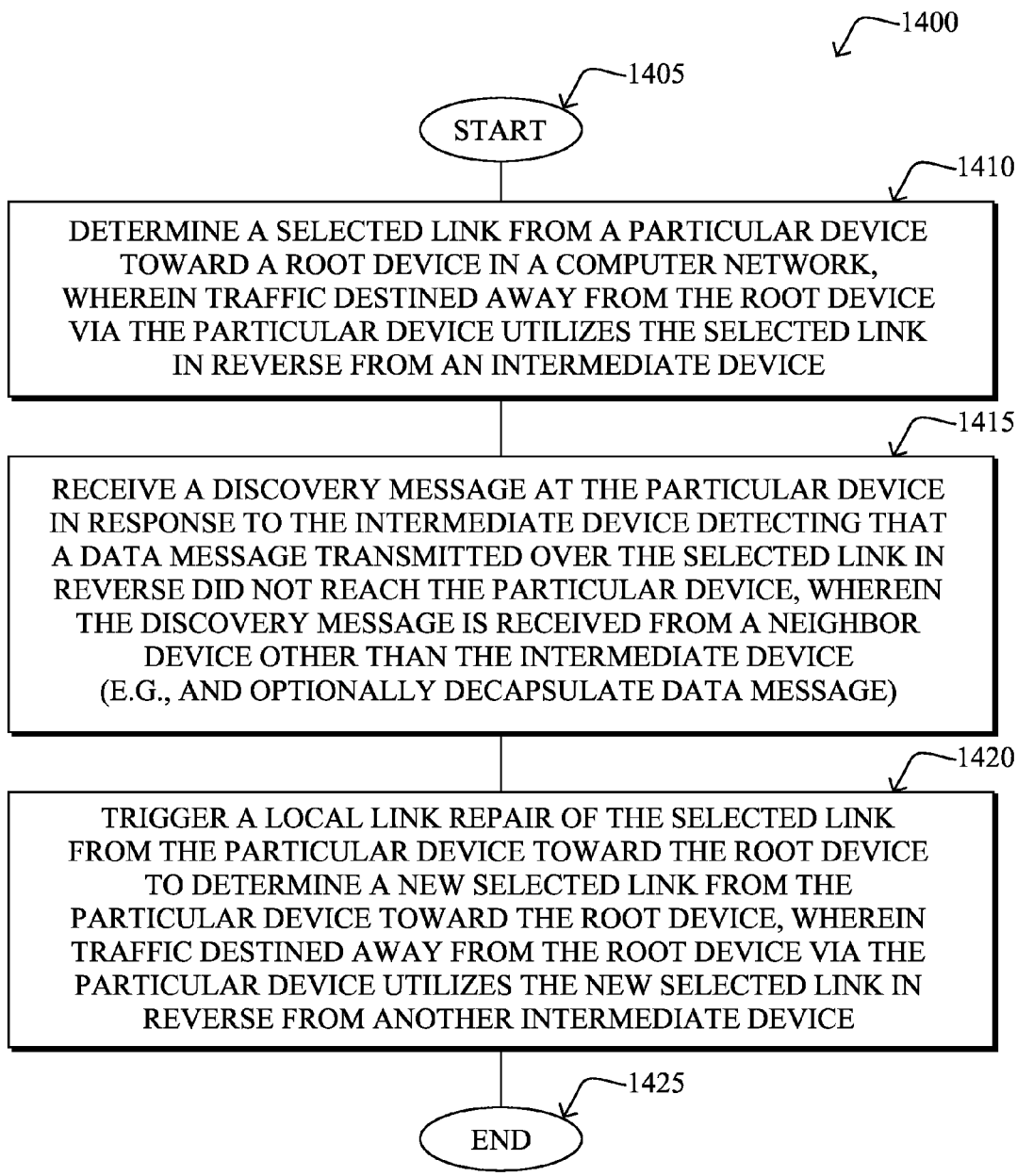
FIG. 14 illustrates an example simplified procedure for efficient link repair mechanism triggered by data traffic in a computer network, particularly from the perspective of the receiver device.

Moreover, FIG. 14 illustrates an example simplified procedure for efficient link repair mechanism triggered by data traffic in a computer network in accordance with one or more embodiments described herein, particularly from the perspective of the receiver device (e.g., node 33). The procedure 1400 may start at step 1405, and continues to step 1410, where, as described in greater detail above, the device determines a selected link from itself toward a root device in a computer network 100, wherein traffic destined away from the root device via the particular device utilizes the selected link in reverse from an intermediate device (e.g., node 22). In step 1415, the receiver device may receive a discovery message 640 in response to the intermediate device detecting that a data message transmitted over the selected link in reverse did not reach the particular receiver device. That is, the discovery message is received from a neighbor device other than the intermediate device. Note that as mentioned above, the receiver device may also optionally decapsulate a data message 540 from within the discovery message 640, if included therein in specific embodiments.

In response to the discovery message, it can be assumed that the link from the intermediate device (e.g., node 22) to the receiver device (e.g., node 33) is broken, and thus in step 1420 the receiver device may trigger a local link repair of the selected link from the particular device toward the root device to determine a new selected link (where traffic destined away from the root device via the particular device utilizes the new selected link in reverse from another intermediate device, e.g., node 23). The illustrative procedure 1400 may then end in step 1425.

Figure 15:
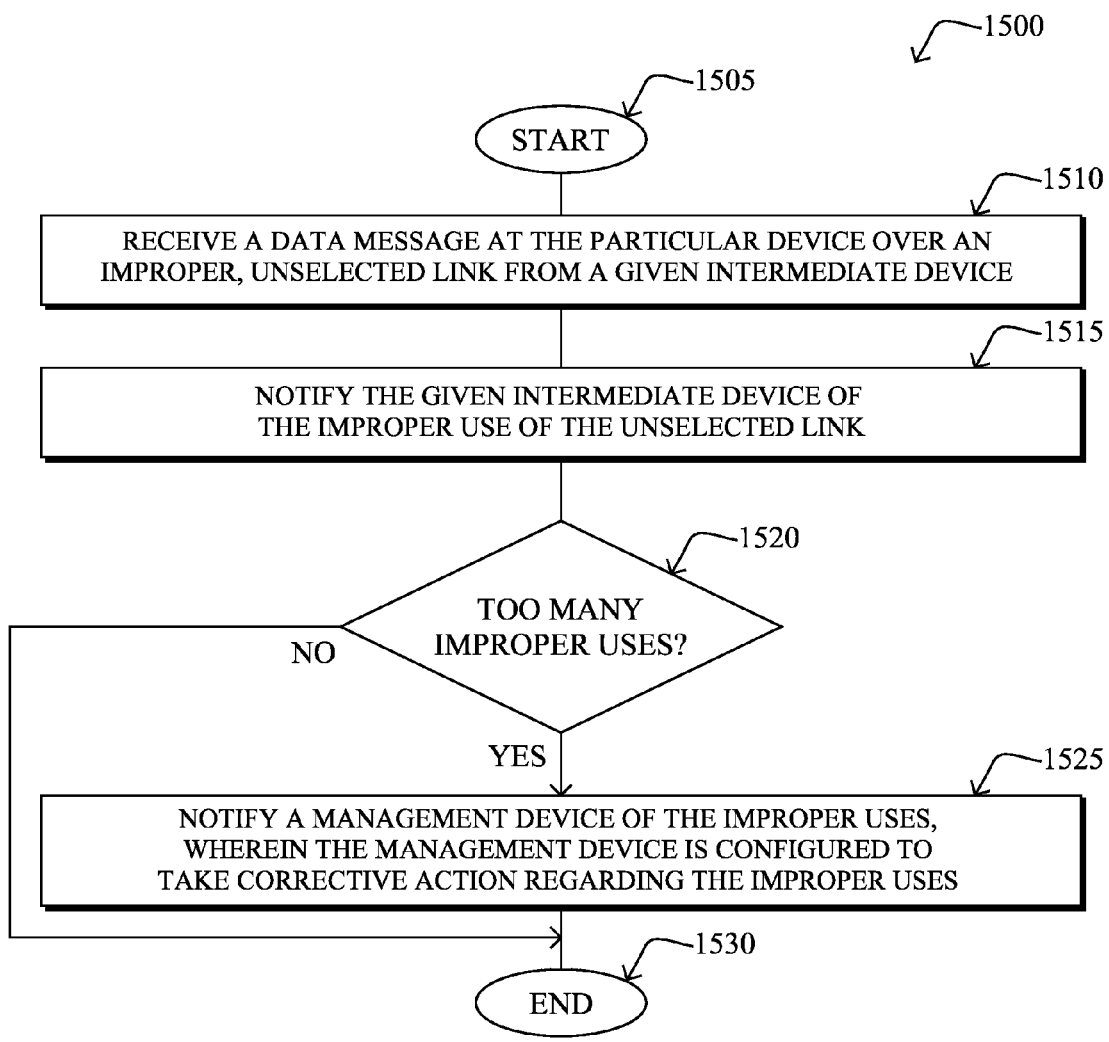
FIG. 15 illustrates another example simplified procedure for efficient link repair mechanism triggered by data traffic in a computer network, particularly from the perspective of the receiver device when a link is used improperly.

Lastly, FIG. 15 illustrates another example simplified procedure for efficient link repair mechanism triggered by data traffic in a computer network in accordance with one or more embodiments described herein, particularly from the perspective of the receiver device when a link is used improperly. The procedure 1500 may start at step 1505, and continues to step 1510, where, as described in greater detail above, the receiver device (e.g., node 33) may receive a data message 540 over an improper, unselected link from a given intermediate device, e.g., node 22 in FIG. 11A above, which is not on the DAG 410. According to the techniques herein, in step 1515, the receiver device may then notify the given intermediate device of the improper use of the unselected link. In addition, if it is determined in step 1520 that there have been too many improper uses of that link (or any link) to the receiver device, then in step 1525, a management device (e.g., NMS 150) may be notified of the improper uses, such that the management device may take corrective action regarding the improper uses, as described above. The procedure 1500 illustratively ends in step 1530.

It should be noted that while certain steps within procedures 1200-1500 may be optional as described above, the steps shown in FIGS. 12-15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1500 are described separately, certain steps from each procedure may be incorporated into each other procedure, and the procedures are not meant to be mutually exclusive.

The techniques described herein, therefore, provide for an efficient link repair mechanism triggered by data traffic in a computer network. In particular, the techniques herein provide a distributed mechanism where in response to data traffic not reaching a node (or not reaching it on its preferred path), that node, once informed of the problem, may trigger corresponding local link repair. Accordingly, the techniques herein address a significant issue in networks that use reverse path routing, significantly improving the path reliability and SLA, particularly in constrained networks. Also, by triggering link repair based on data traffic, that is, when a packet is being delivered along a broken or discontinued path, network devices minimize overhead that would be otherwise caused by keepalive messages.

While there have been shown and described illustrative embodiments that provide for efficient link repair mechanism triggered by data traffic in a computer network, it is to be understood that various other adaptations and modifications may be made within the spirit and scope of the embodiments herein. For example, the embodiments have been shown and described herein with relation to LLNs. However, the embodiments in their broader sense are not as limited, and though well-suited for constrained networks, may, in fact, be used with other types of networks and/or protocols. In addition, while certain protocols are shown, such as RPL, other suitable protocols may be used, accordingly. Also, while the techniques generally describe the root node as the source device, other devices, particularly head-end nodes and/or network management system/server (NMS) devices, may also source data messages (e.g., in the DOWNWARD direction).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   transmitting, by an intermediate device, a data message away from a root device toward a receiver device in a computer network, the data message transmitted by utilizing, in reverse, a link that had been previously selected by the receiver device toward the root device;
   detecting that the data message did not reach the receiver device;
   in response to detecting that the data message did not reach the receiver device, sending a discovery message to one or more neighbor devices, wherein the discovery message carries an identification (ID) of the receiver device and a discovery scope indicating how many hops the discovery message is allowed to traverse to reach the receiver device, and wherein the receiver device, upon receiving the discovery message, triggers a local link repair of the link from the receiver device toward the root device;
   sending the discovery message one discovery scope level at a time, wherein each neighbor device receiving the discovery message checks whether it can reach the receiver device, and if so, notifies the intermediate device, and if not, delays a configured time before forwarding the discovery message to a next discovery scope level; and
   sending, in response to receiving a notification at the intermediate device that a particular neighbor device can reach the receiver device, an instruction to each other neighbor device to cease forwarding the discovery message.

2. The method as in claim 1, further comprising:
   maintaining a one-hop neighbor list at the intermediate device; and
   sending the discovery message to the one or more neighbor devices from the one-hop neighbor list.

3. The method as in claim 1, further comprising:
   sending the discovery message to only neighbor devices that are as far as or further than the intermediate device from the root device.

4. The method as in claim 1, wherein sending the discovery message comprises one of either unicasting the discovery message or multicasting the discovery message.

5. The method as in claim 1, further comprising:
   encapsulating the data message within the discovery message.

6. The method as in claim 1, further comprising:
   receiving, from a particular neighbor device that can reach the receiver device, a reply to the discovery message, wherein the reply carries a proper path to the receiver device.

7. The method as in claim 1, wherein the discovery message is originated by one of either the intermediate device, or a source of the data message after having been notified that the data message did not reach the receiver device.

8. The method as in claim 1, further comprising:
   determining that the discovery message did not result in reaching the receiver device; and
   in response, increasing the discovery scope of a subsequently sent discovery message to the receiver device.

9. A method, comprising:
   receiving a discovery message at a particular device in response to an intermediate device detecting that a data message transmitted away from a root device toward a receiver device in a computer network did not reach the receiver device, wherein the data message was transmitted utilizing, in reverse, a link that had been previously selected by the receiver device toward the root device, wherein the discovery message carries an identification (ID) of the receiver device and a discovery scope indicating how many hops the discovery message is allowed to traverse to reach the receiver device;
   determining whether the receiver device is reachable by the particular device; and
   in response to the receiver device being reachable, forwarding the discovery message to the receiver device, wherein the receiver device, upon receiving the discovery message, triggers a local link repair of the link from the receiver device toward the root device;
   in response to the receiver device not being reachable, decrementing the discovery scope, and, if the decremented discovery scope is non-zero, forwarding the discovery message to one or more neighbor devices of the particular device;
   forwarding the discovery message one discovery scope level at a time, wherein each neighbor device receiving the discovery message checks whether it can reach the receiver device, and if so, notifies the particular device, and if not, delays a configured time before forwarding the discovery message to a next discovery scope level; and
   sending, in response to receiving a notification at the particular device that a particular neighbor device can reach the receiver device, an instruction to each other neighbor device to cease forwarding the discovery message.

10. The method as in claim 9, further comprising:
    maintaining a one-hop neighbor list at the particular device; and
    forwarding the discovery message to the one or more neighbor devices from the one-hop neighbor list.

11. The method as in claim 9, further comprising:
    sending the discovery message to only neighbor devices that are as far as or further than the particular device from the root device.

12. The method as in claim 9, wherein forwarding the discovery message comprises one of either unicasting the discovery message or multicasting the discovery message.

13. The method as in claim 9, further comprising:
    in response to the receiver device being reachable over a proper path, returning a reply to the discovery message, wherein the reply carries a proper path to the receiver device.

14. An apparatus, comprising:
    one or more network interfaces to communicate in a computer network;
    a processor coupled to the network interfaces and adapted to execute one or more processes; and
    a memory configured to store a process executable by the processor, the process when executed operable to:
    generate and transmit a discovery message in response to a data message sent away from a root device of the computer network not reaching an intended receiver device over a link that had been previously selected, in reverse, by the receiver device toward the root device;

receive a discovery message for a first intermediate device transmitting a different data message and to forward the discovery messages to the receiver device if reachable, else, in response to the receiver device not being reachable, decrement a discovery scope of the discovery messages, and forward a discovery message with a non-zero scope to one or more neighbor devices;

forward the discovery message one discovery scope level at a time, wherein each neighbor device receiving the discovery message checks whether it can reach the receiver device, and if so, notifies the apparatus, and if not, delays a configured time before forwarding the discovery message to a next discovery scope level;

send, in response to receiving a notification at the apparatus that a particular neighbor device can reach the receiver device, an instruction to each other neighbor device to cease forwarding the discovery message; and receive a discovery message intended for the apparatus in response to a second intermediate device detecting that a data message did not reach the apparatus over a link previously selected, in reverse, from the apparatus to the second intermediate device, and to trigger a local link repair of the previously selected link in response.

15. The apparatus as in claim 14, wherein the process when executed is further operable to:

receive a data message over an improper, unselected link from a given intermediate device; and notify the given intermediate device of the improper use of the unselected link.

16. A tangible, non-transitory, computer-readable media having software encoded thereon, the software, when executed by a processor on an apparatus, operable to:

generate and transmit a discovery message in response to a data message sent away from a root device of the computer network not reaching an intended receiver device over a link that had been previously selected, in reverse, by the receiver device toward the root device;

receive a discovery message for a first intermediate device transmitting a different data message and to forward the discovery messages to the receiver device if reachable, else, in response to the receiver device not being reachable, decrement a discovery scope of the discovery messages, and forward a discovery message with a non-zero scope to one or more neighbor devices;

forward the discovery message one discovery scope level at a time, wherein each neighbor device receiving the discovery message checks whether it can reach the receiver device, and if so, notifies the apparatus, and if not, delays a configured time before forwarding the discovery message to a next discovery scope level;

send, in response to receiving a notification at the apparatus that a particular neighbor device can reach the receiver device, an instruction to each other neighbor device to cease forwarding the discovery message; and receive a discovery message intended for the apparatus in response to a second intermediate device detecting that a data message did not reach the apparatus over a link previously selected, in reverse, from the apparatus to the second intermediate device, and to trigger a local link repair of the previously selected link in response.

* * * * *